US012651599B2

(12) United States Patent
Namazifar et al.

(10) Patent No.: US 12,651,599 B2
(45) Date of Patent: Jun. 9, 2026

(54) GENERATING MODEL OUTPUT USING A KNOWLEDGE GRAPH

(71) Applicant: Amazon Technologies, Inc., Seattle, WA (US)

(72) Inventors: Mahdi Namazifar, Oakland, CA (US); Di Jin, Santa Clara, CA (US); Yang Liu, Los Altos, CA (US); Devamanyu Hazarika, Sunnyvale, CA (US); Dilek Hakkani-Tur, Los Altos, CA (US); Yubin Ge, Champaign, IL (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 18/340,342

(22) Filed: Jun. 23, 2023

(65) Prior Publication Data

US 2024/0428787 A1 Dec. 26, 2024

(51) Int. Cl.
| | |
|---|---|
| *G10L 15/22* | (2006.01) |
| *G06F 40/295* | (2020.01) |
| *G10L 15/18* | (2013.01) |
| *G10L 15/183* | (2013.01) |

(52) U.S. Cl.
CPC ............ *G10L 15/22* (2013.01); *G06F 40/295* (2020.01); *G10L 15/183* (2013.01)

(58) Field of Classification Search
CPC ......... G10L 15/22; G10L 15/18; G06F 40/35; G06N 5/02
See application file for complete search history.

(56) References Cited

U.S. PATENT DOCUMENTS

| | | | | |
|---|---|---|---|---|
| 10,462,422 | B1 * | 10/2019 | Harrison | ........ G06Q 10/063114 |
| 10,511,808 | B2 * | 12/2019 | Harrison | ................ H04N 5/262 |
| 10,782,986 | B2 * | 9/2020 | Martin | ................ G10L 15/1815 |
| 10,803,050 | B1 * | 10/2020 | Salkola | ................ G06F 16/338 |
| 10,936,346 | B2 * | 3/2021 | Natarajan | ............... G10L 15/16 |
| 10,963,273 | B2 * | 3/2021 | Peng | ..................... H04L 51/216 |

(Continued)

OTHER PUBLICATIONS

Li, Sha, et al. "Enhanced knowledge selection for grounded dialogues via document semantic graphs." arXiv preprint arXiv:2206. 07296 (2022). (Year: 2022).*

(Continued)

*Primary Examiner* — Jialong He
(74) *Attorney, Agent, or Firm* — Pierce Atwood LLP

(57) ABSTRACT

Techniques for constraining the results of a generative language model to valid information using knowledge-grounded documentation. A generative language model may generate invalid results, including compound entities and incorrect entity relations. The techniques include, for a given user inquiry, determining a set of documented information, from a particular knowledge base, that corresponds to the user inquiry. The techniques further include determining a subgraph from a knowledge graph representing the knowledge base, as well as determining a trie data structure representation of the set of documented information. The user inquiry and subgraph are provided as input to a trained generative language model for generating a response to the user inquiry. The techniques include using the trie data structure to validate that the generated response corresponds to real information from the set of documented information.

20 Claims, 13 Drawing Sheets

(56) References Cited

U.S. PATENT DOCUMENTS

| | | | | |
|---|---|---|---|---|
| 11,010,179 | B2 * | 5/2021 | Natarajan | G06V 40/28 |
| 11,010,436 | B1 * | 5/2021 | Peng | G06F 3/013 |
| 11,038,974 | B1 * | 6/2021 | Koukoumidis | H04L 43/0882 |
| 11,115,410 | B1 * | 9/2021 | Hanson | H04L 63/0861 |
| 11,301,521 | B1 * | 4/2022 | Schissel | G06N 3/006 |
| 11,429,649 | B2 * | 8/2022 | Yu | G06F 16/338 |
| 11,442,992 | B1 | 9/2022 | Moon et al. | |
| 2019/0327330 | A1 * | 10/2019 | Natarajan | G10L 17/22 |
| 2021/0073474 | A1 * | 3/2021 | Sengupta | G06F 40/247 |
| 2021/0173873 | A1 * | 6/2021 | Wang | G06F 16/9024 |
| 2022/0129556 | A1 * | 4/2022 | Chen | G06F 21/74 |
| 2022/0415320 | A1 * | 12/2022 | Zheng | G06F 40/237 |

OTHER PUBLICATIONS

Lin, Yen-Ting, et al. "Selective in-context data augmentation for intent detection using pointwise v-information." arXiv preprint arXiv:2302.05096 (Feb. 2023). (Year: 2023).*

Xu, Yan, et al. "Kilm: Knowledge injection into encoder-decoder language models." arXiv preprint arXiv:2302.09170 (Feb. 2023). (Year: 2023).*

Zhao, Chao, et al. ""What do others think?": Task-Oriented Conversational Modeling with Subjective Knowledge." arXiv preprint arXiv:2305.12091 (May 20, 2023). (Year: 2023).*

Lee, Nayeon, et al. "Factuality enhanced language models for open-ended text generation." Advances in Neural Information Processing Systems 35 (2022): 34586-34599. (Year: 2022).*

Shuster, Kurt, et al. "Retrieval augmentation reduces hallucination in conversation." arXiv preprint arXiv:2104.07567 (2021). (Year: 2021).*

International Search Report and Written Opinion mailed Jun. 18, 2024 for International Patent Application No. PCT/US2024/019641.

Bast, et al., 2014. Easy access to the freebase dataset. In Proceedings of the 23rd International Conference on World Wide Web, pp. 95-98.

Cao, et al,. 2020. Autoregressive entity retrieval. In International Conference on Learning Representations.

Dinan, et al., 2018. Wizard of wikipedia: Knowledge-powered conversational agents. In International Conference on Learning Representations.

Eric, et al. 2021. Multi-sentence knowledge selection in open-domain dialogue. In Proceedings of the 14th International Conference on Natural Language Generation, Aberdeen, Scotland, UK. Association for Computational Linguistics.

Grusky, et al., 2018. Newsroom: A dataset of 1.3 million summaries with diverse extractive strategies. In Proceedings of the 2018 Conference of the North American Chapter of the Association for Computational Linguistics: Human Language Technologies, vol. 1 (Long Papers), pp. 708-719.

Josifoski, et al., 2022. GenIE: Generative information extraction. In Proceedings of the 2022 Conference of the North American Chapter of the Association for Computational Linguistics: Human Language Technologies, pp. 4626-4643, Seattle, United States. Association for Computational Linguistics.

Kim, et al., 2019. Sequential latent knowledge selection for knowledge-grounded dialogue. In International Conference on Learning Representations.

Lewis, et al., 2020. BART: Denoising sequence-to-sequence pre-training for natural language generation, translation, and comprehension. In Proceedings of the 58th Annual Meeting of the Association for Computational Linguistics, pp. 7871-7880, Online. Association for Computational Linguistics.

Li, et al., 2022. Enhancing knowledge selection for grounded dialogues via document semantic graphs. In Proceedings of the 2022 Conference of the North American Chapter of the Association for Computational Linguistics: Human Language Technologies, Seattle, United States. Association for Computational Linguistics.

Lian, et al., 2019. Learning to select knowledge for response generation in dialog systems. In IJCAI International Joint Conference on Artificial Intelligence, p. 5081.

Lin and Eduard Hovy. 2002. Manual and automatic evaluation of summaries. In Proceedings of the ACL-02 Workshop on Automatic Summarization, pp. 45-51.

Moon, et al., 2019. OpenDialKG: Explainable conversational reasoning with attention-based walks over knowledge graphs. In Proceedings of the 57th Annual Meeting of the Association for Computational Linguistics, Florence, Italy. Association for Computational Linguistics.

Paszke, et al., 2019. Pytorch: An imperative style, high-performance deep learning library. In Advances in Neural Information Processing Systems (NeurIPS).

Szegedy, et al., 2016. Rethinking the inception architecture for computer vision. In Proceedings of the IEEE conference on computer vision and pattern recognition, pp. 2818-2826.

Vrandečić. 2012. Wikidata: A new platform for collaborative data collection. In Proceedings of the 21st international conference on world wide web, pp. 1063-1064.

Wang, et al., 2013. XLore: a large-scale English-Chinese bilingual knowledge graph. In Proceedings of the 12th International Semantic Web Conference (Posters & Demonstrations Track)—vol. 1035, pp. 121-124.

Wolf, et al., 2020. Transformers: State-of-the-art natural language processing. In Proceedings of the 2020 Conference on Empirical Methods in Natural Language Processing: System Demonstrations (EMNLP).

Wu, et al., 2019. Proactive human-machine conversation with explicit conversation goal. In Proceedings of the 57th Annual Meeting of the Association for Computational Linguistics, pp. 3794-3804.

Wu, et al., 2021. Dialki: Knowledge identification in conversational systems through dialogue-document contextualization. In Proceedings of the 2021 Conference on Empirical Methods in Natural Language Processing, pp. 1852-1863.

Zhang, et al., 2019. Bertscore: Evaluating text generation with bert. In International Conference on Learning Representations.

Zhang, et al., 2021. Greaselm: Graph reasoning enhanced language models. In International Conference on Learning Representations.

Zheng, et al., 2020. Difference-aware knowledge selection for knowledge-grounded conversation generation. In Findings of the Association for Computational Linguistics: EMNLP 2020. Association for Computational Linguistics.

Zhou, et al., 2020. KDCONV: A Chinese multi-domain dialogue dataset towards multi-turn knowledge-driven conversation. In Proceedings of the 58th Annual Meeting of the Association for Computational Linguistics, pp. 7098-7108.

Notification Concerning Transmittal of International Preliminary Report on Patentability for International Patent Application No. PCT/US2024/019641, mailed on Jan. 2, 2026, 8 pages.

* cited by examiner

Doberman Pinscher

Golden Retriever

Labrador Retriever

The Labrador Retriever is a breed of domesticated dog. The Labrador belongs to the sporting group of dogs. The Labrador is widely kept as a companion dog and may be trained as a guide dog.

Dog Breed
Knowledge Documents
265

Dog Breed
Subgraph
290

Figure 7:
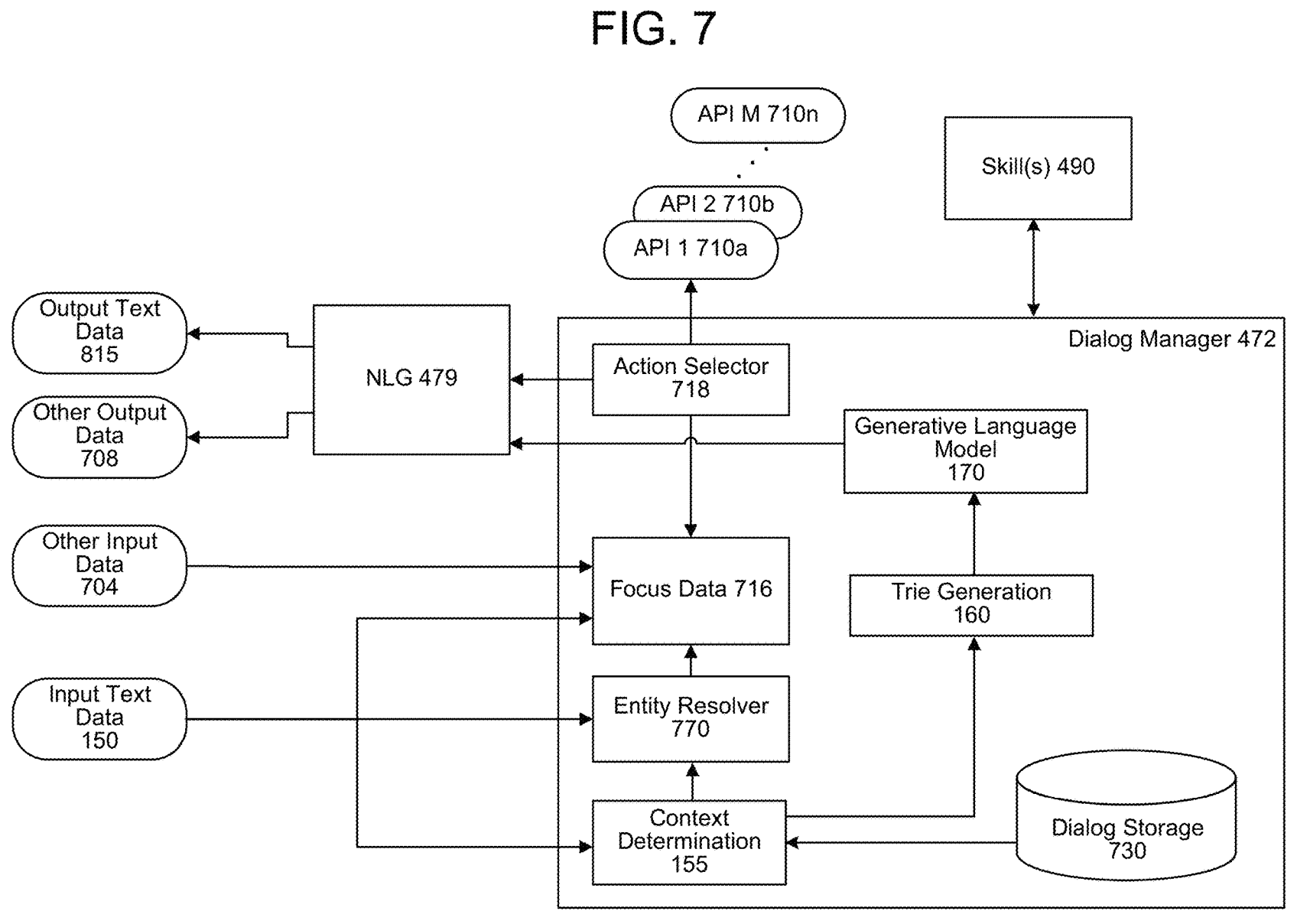

Dialog Manager 472

Skill(s) 490

Generative Language Model 170

Trie Generation 160

Dialog Storage 730

API M 710n

API 2 710b

API 1 710a

Action Selector 718

Focus Data 716

Entity Resolver 770

Context Determination 155

NLG 479

Output Text Data 815

Other Output Data 708

Other Input Data 704

Input Text Data 150

FIG. 9

Headphones
110m/110n

Microwave
110j

Refrigerator
110i

Washer/
Dryer
110h

Smart TV
110g

Tablet Computer
110d

Skill System(s)
425

System
Component(s)
120

Network(s)
199

Motile Device
110k

Vehicle
110e

Smart Phone
110b

Smart Watch
110c

Speech-Detection
Device(s)
110a

Speech-Detection
Device(s) with Display
110f

GENERATING MODEL OUTPUT USING A KNOWLEDGE GRAPH

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram of how natural language processing is performed, according to embodiments of the present disclosure.

FIG. 7 is a conceptual diagram of components of a dialog manager component,

FIG. 9 is a block diagram conceptually illustrating example components of a device, according to embodiments of the present disclosure.

DETAILED DESCRIPTION

Figure 1A:
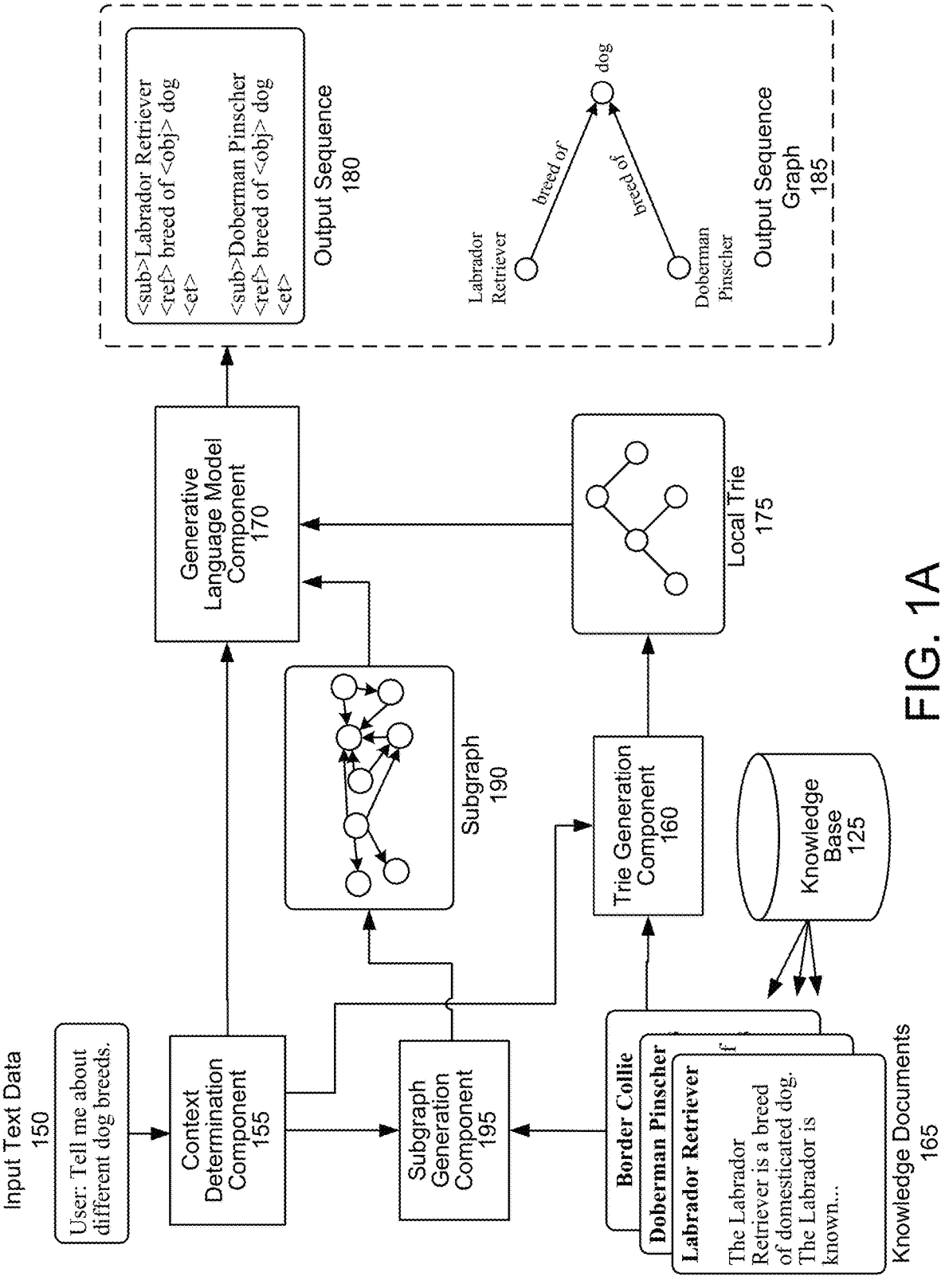
FIG. 1A is a conceptual diagram of the knowledge graph based generative model process with local trie constraints, in accordance with some embodiments.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A user may engage in a dialog with the virtual assistant system, such as the user providing speech or text input and receiving from the system synthesized speech or textual responses. In certain situations, a user input/utterance may include a question to be answered by the system. That is, the user may ask the system to provide some information in response to the user input. The ultimate command in this example would be to provide the information requested. As part of processing to respond to the user query, the system may rely on a structured knowledge base to obtain or confirm information requested by the query. A structured knowledge base is a data store that includes facts organized in a particular manner that may be used to respond to user queries. A structured knowledge base may represent many types of information. For example, the information may correspond to documents related to a specific subject matter (e.g., repair manuals for [brand] automobiles, basketball articles from a local newspaper, etc.), to a collection of many different subject matters (e.g., Wikipedia, research journal archives, books from a library, etc.) or other kinds of information.

In one example, a knowledge base may include a collection of tuples (related items) and may encode formal semantics (relationship between the items) on the data stored within the knowledge base. A knowledge base or other organized information storage may store information in a "tuple" format, where entities are joined together in pairs, triplets, or the like, that define the relationship between two things. For example a tuple such as [John Doe, husband of, Jane Doe] may describe that John Doe is Jane Doe's husband. Many such tuples may exist in a knowledge base and may be usable to answer incoming informational queries. For example, the above tuple may be used to answer a question such as "who is Jane Doe's husband," "who is John Doe married to" or the like.

In another form of structured knowledge base information may be stored in a form representative of a knowledge graph, such as a directed acyclic graph (DAG) which graphs nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe."

It should be appreciated that references may be made herein to a computing system using a knowledge graph where the data corresponding to the knowledge graph may not actually comprise a visual graph, but rather data representing a graph. Such data may take many forms, for example one set of data (e.g., for a table) comprising entries representing entities (e.g., nodes) and another set of data (e.g., for a table) comprising entries representing vertices or connections between the nodes. The table entries for nodes may include references to particular vertices that point to/from the respective node (and/or other data). Similarly, table entries for the vertices may include references to particular nodes the vertices connect (and/or other data). In this manner data for a knowledge base may be stored and used by a computing system. As appreciated by one of skill in the art, operations discussed herein may use such data to manipulate, traverse, and/or edit the knowledge graph.

A knowledge graph is a graph where the nodes and edges correspond to a grounded world meaning, such as from books, news articles, or research papers. A knowledge graph presents a representation of knowledge/data that is different than the representation of knowledge in textual document format. For example, a knowledge graph provided by Wikidata is a representation of the documented information presented in Wikipedia. As can be appreciated, the knowledge represented in a knowledge graph for an entity (e.g., "dogs," "automobiles," "United States," etc.) may be in the "vicinity" of the node associated with that entity (e.g., information collocation). That is, the data relevant to an entity may either be directly linked to the entity or available only a few connected nodes away. However, outside of the knowledge graph, that same information may be located across many written (e.g., electronic) documents (e.g., web pages, news articles, books, etc.). Thus, using a knowledge graph to obtain information relevant to an entity may in some ways be advantageous over obtaining the same information from many different documents. As described here, a document, or information record, may be considered a circumscribed set of data related to knowledge or information comprising factual definitions, entities, and relationships.

Knowledge-grounding for system generated responses is an important goal in dialog systems as it may promote more informative conversations, in addition to continued user requests. A fundamental challenge is the retrieval of appropriate and/or valid information given the dialog context corresponding to the user input. Simple text-based retrieval from data sources that is used for identifying pertinent information may not utilize the advantages provided by knowledge graphs, such as information colocation. On the other hand, graph encoding techniques may not include the inter-node relationships of the knowledge graph.

A generative model is a machine learning model that is configures to generate output data that may not have existed previously. Examples include text generative models, image generative models, etc. A generative model, in particularly a text generative model, may be trained using a knowledge graph. In doing so, the generative model may incorporate information from the knowledge graph as a result of this training. Thus, at inference time when the generative model is prompted to create an output, the generative model may be able to generate requested information instead of involving a separate operation to traverse the knowledge graph to identify and retrieve the requested information. Thus the generative model may receive text, such as a textual representation of a user utterance query received by the virtual assistant system and then may generate, based on information it has incorporated from the knowledge graph during training, relevant data responsive to the query.

A generative model may be configured to generate output data in different formats. A generative model, such as a generative language model, may generate a natural language response. For example, the generated responsive data may be in a textual format for TTS conversion or presentation, such as in an interaction with a chat-bot. A generative model may, alternatively or in addition, generate tuples of data, such as a triplet comprising a subject entity, a relation, and an object entity (e.g., "Sacramento, is the capitol of, California"). Such tuples may be passed to another component (such as a natural language generation component) for generating natural language response data that can be output to a user.

In certain system configurations, obtaining information stored in a knowledge graph may be retrieved by traversing the knowledge graph. Depending on the size of data representing a knowledge graph, a large amount of computer memory may be required to store the knowledge graph and a large amount of computing power/time may be needed to traverse the knowledge graph. As can be appreciated, a knowledge graph that is "comprehensive" in some manner, such as Wikidata, may be very large and performing operations on such a knowledge graph may involve expending a significant amount of computing resources. A generative model that is trained using the knowledge graph, however, may have a smaller memory requirement than the knowledge graph itself, and may thus reduce the use of computing resources when attempting to obtain an answer to a question that requires reference to the knowledge graph.

However, as a generative model is typically configured to generate or infer relevant data corresponding to an input query, there are circumstances in which the generative model may generate invalid data, such as an entity that does not exist (e.g., "West America," "green dog," etc.) or invalid triplets of disconnected entities and relations (e.g., "Chicago, is president of, dog"). Thus, even though a generative model may be trained using a knowledge base, operation of such a generative model at inference is not a guarantee that the output of the generative model necessarily represents facts which are themselves represented in the knowledge base. Further, a generative model trained based on a specific knowledge base may become stale or outdated if the knowledge base changes to reflect updated or new information. Thus, updates to a knowledge base may require retraining of a new generative model. Such a training is itself a significant expenditure of computing resources.

The methods and techniques described herein propose dynamically constructing an ordered tree-based data structure (called a "trie") that is based on grounded knowledge documents but is more limited to the subject of a user query and can be used to ensure that information output by a generative language model is correct. Such a limited data structure may be referred to as a local trie. The local trie may be used as input to a generative model and thus may constrain the generative model to inferring triplets/or other data that are actually valid. The trie-based constrained decoding is used to guide the generative model's decoding steps based on local tries built from the knowledge base.

Figure 1B:
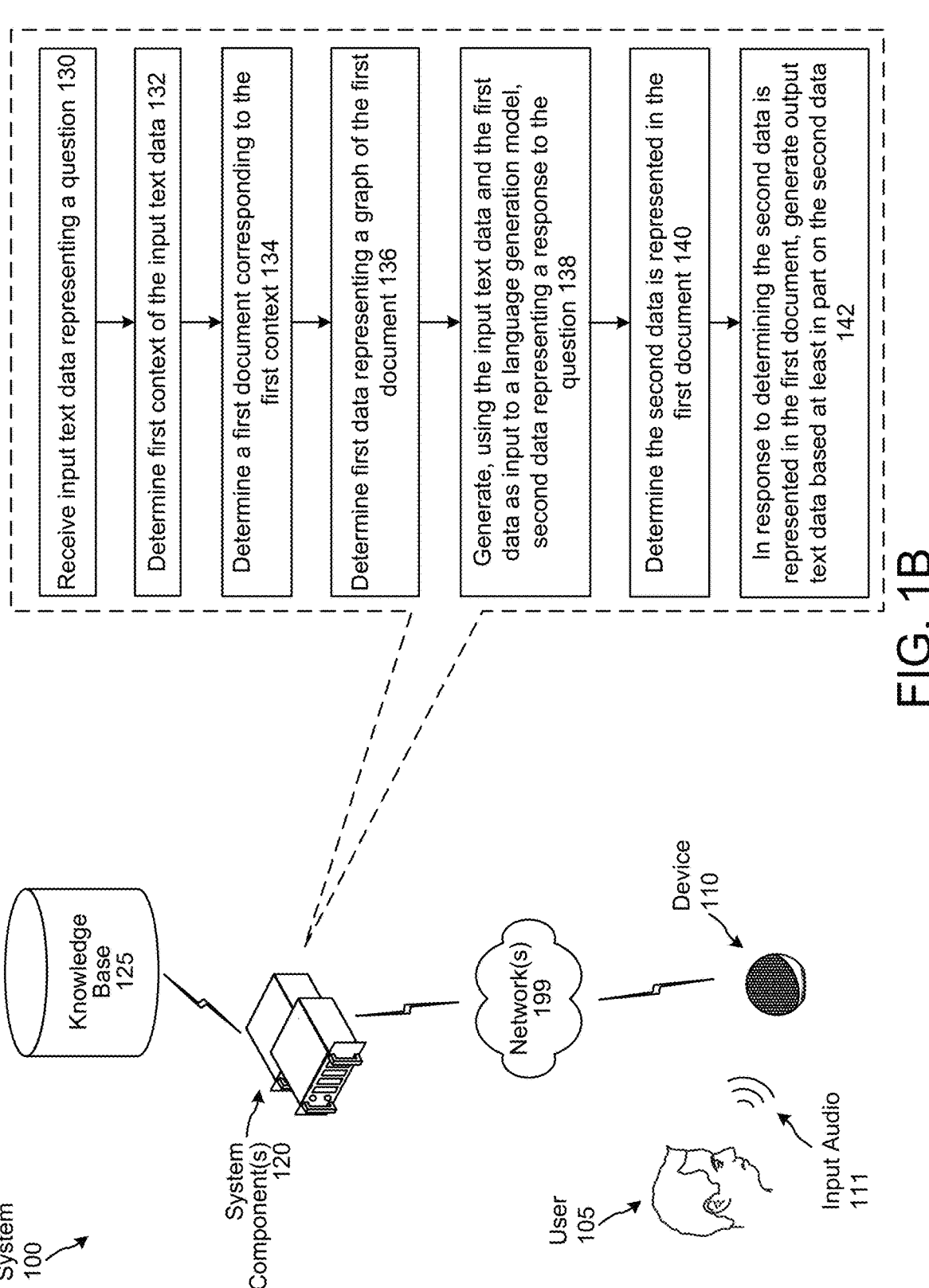
FIG. 1B is a conceptual diagram illustrating a virtual assistant system for natural language processing and knowledge-based information generation, according to embodiments of the present disclosure.

FIG. 1A is a diagram of the knowledge graph based generative model process with local trie constraints, in accordance with embodiments of the present disclosure. As described above, and as shown in FIG. 1B, a user 105 may interact, or dialog, with a virtual assistant system which may operate components according to the embodiments shown in FIG. 1A. As illustrated in FIG. 1B, a user 105 may direct a natural language input such as speech (e.g., audio input 111) to a local device 110 that is part of the virtual assistant system 100. The device 110 may convert the input audio 111 to audio data 411 and send the audio data to the system component(s) 120. The user utterances may include queries or requests for information. The virtual assistant system 100 may access one or more source of information (e.g., Wikipedia, library archives, etc.) to use as a grounded knowledge base 125.

Figure 4:
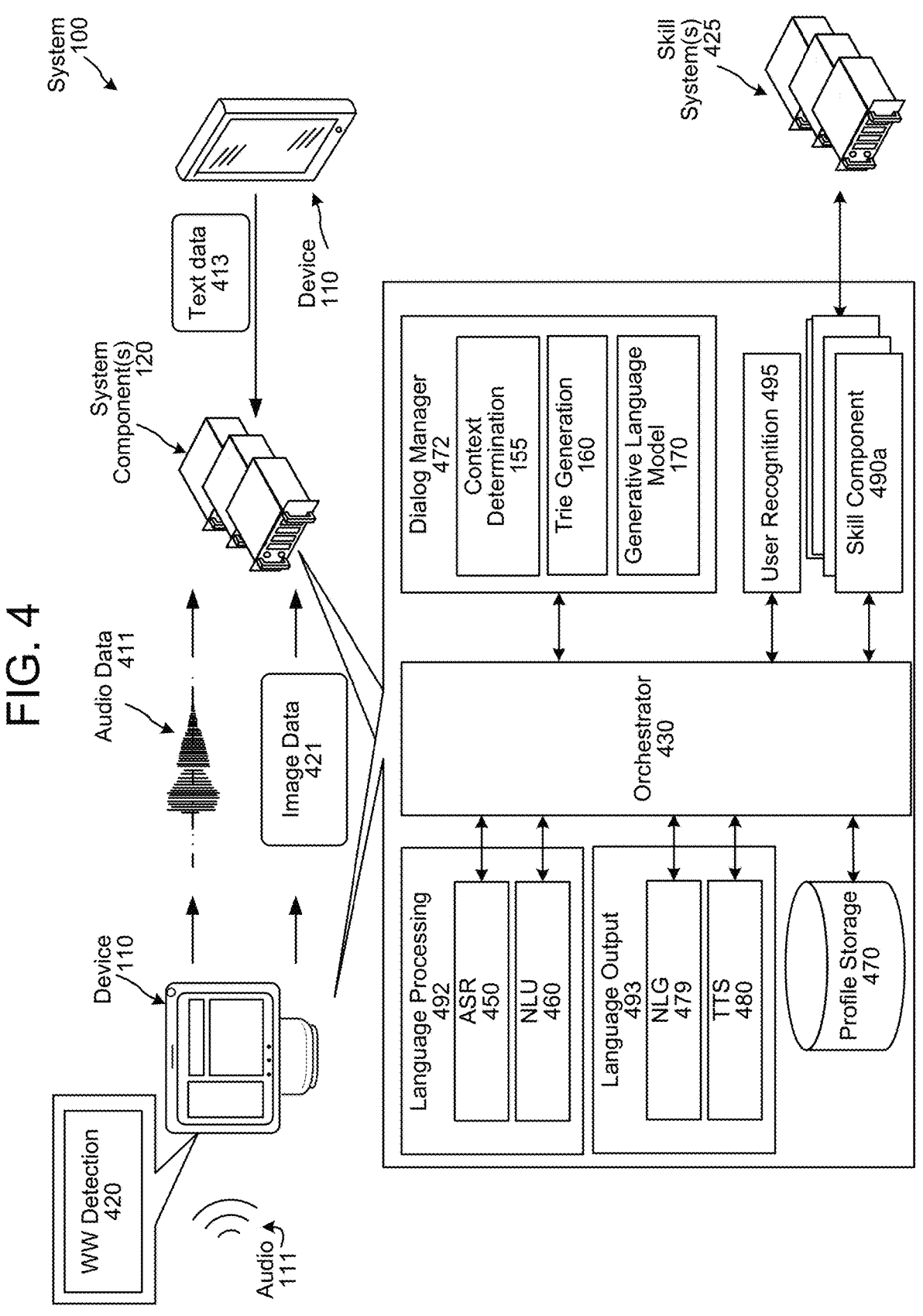
FIG. 4 is a conceptual diagram of components of the system, according to embodiments of the present disclosure.
Figure 5:
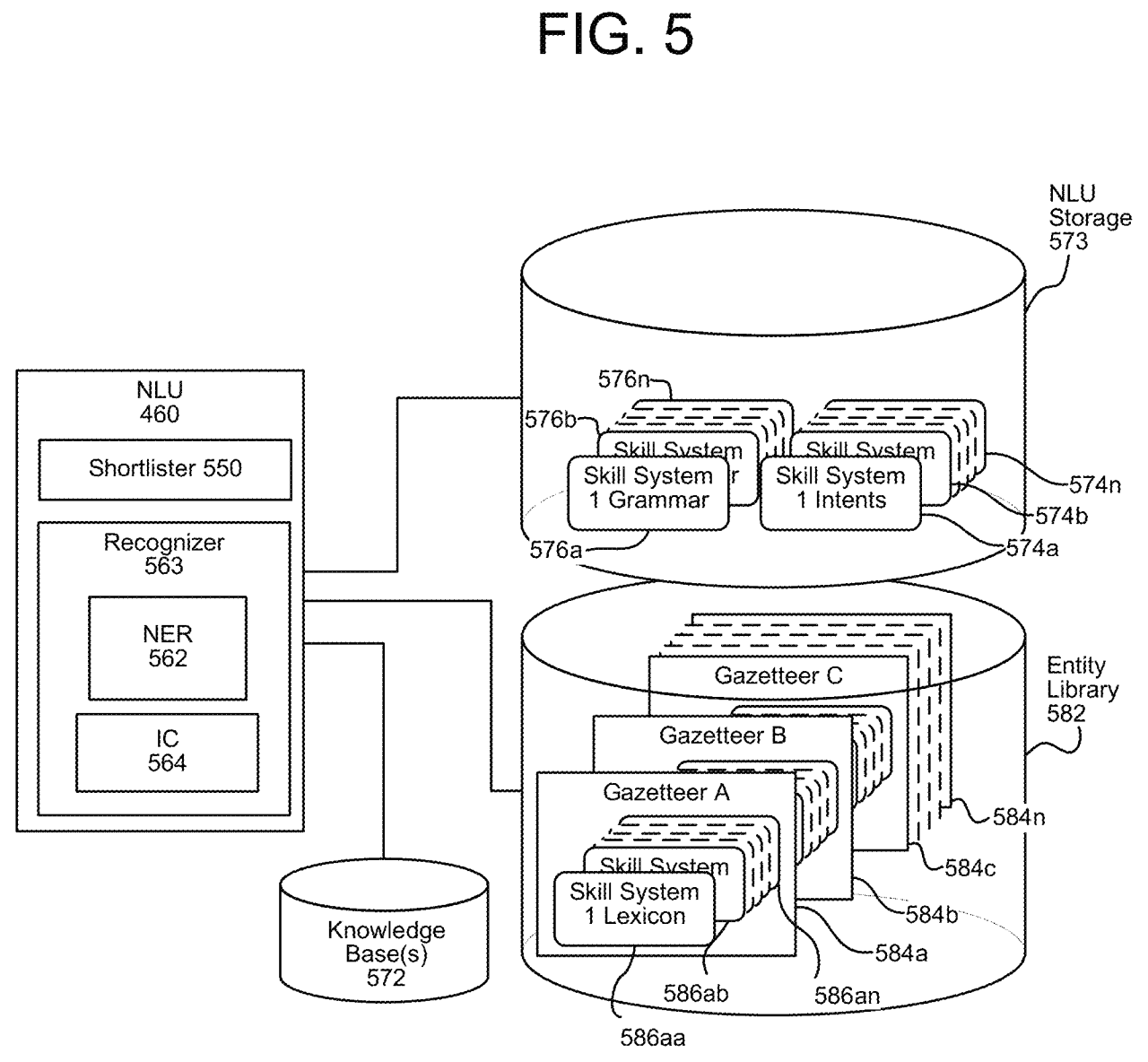
Figure 6:
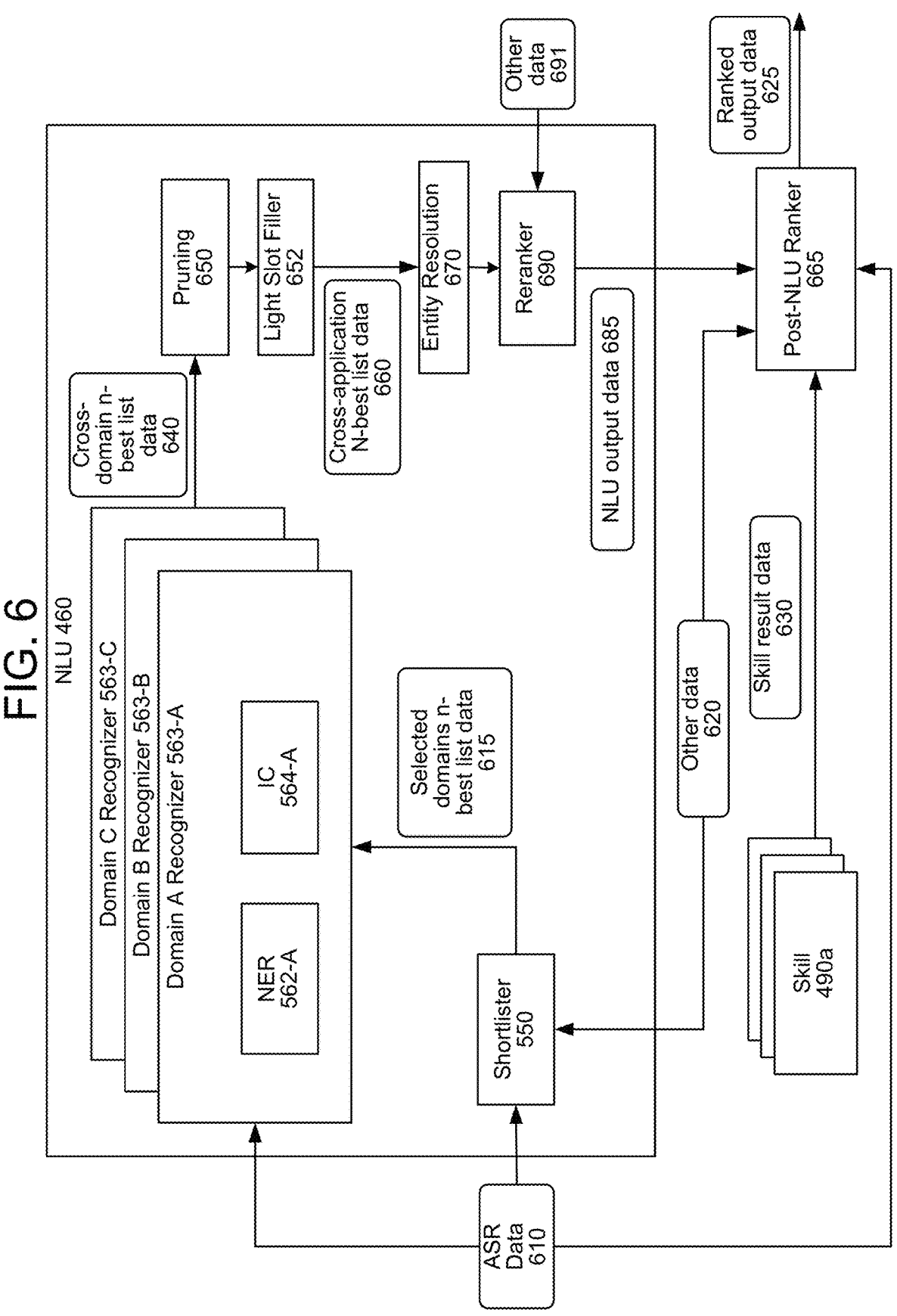
FIG. 6 is a conceptual diagram of how natural language processing is performed, according to embodiments of the present disclosure.

The virtual assistant system 100 may receive a user utterance, and as described in reference to FIGS. 4-6, the system 100 may perform speech processing, such as ASR processing to determine a textual data representation of the user utterance. The input text data 150 represents the textual data of a user utterance. (The input text data 150 may also be received via a textual or other input mechanism.) The input text data 150 may represent a request for information (e.g., "Tell me about different dog breeds", "What year was the capitol of Arizona founded?", etc.). A context determination component 155 may receive (130) the input text data 150. The context determination component 155 may determine (132) a context and/or subject for the received input text data 150. For example, if the input text data 150 is "Tell me about different dog breeds," then the context determination component 155 may determine a context of "dog breeds."

The context determination component 155 may receive intent data from the NLU component 460. As described in reference to FIGS. 5 and 6, the NLU component 460 may determine an intent or meaning of the user utterance or input text data 150. In some embodiments, the context determination component 155 may use previous interactions and dialog sessions as part of the context determination. The input text data 150 may be a part of a dialog session that includes prior user utterances and system responses. The context determination component 155 may use the prior interactions of the dialog session to determine and/or refine the context of the input text data 150. For example, if prior to the input text data 150 of "Tell me about different dog breeds" the user 105 asked, "What is the most popular dog breed?" and the system generated response was "Labrador Retriever," then the context determination component 155 may determine a context such as "dog breeds similar to the Labrador Retriever" so that the response generation may focus on dog breeds related to the Labrador Retriever.

In some embodiments, the context determination component 155 may use prior dialog sessions as part of the context determination. For example, if the user has had previous conversations with the virtual assistant system concerning automobiles from Europe, then when the user makes a query such as "Tell me the new cars this year," then the context determination component 155 may use the previous conversations to direct the context toward "new European cars." The context determination component 155 may also use other data to determine the context such as, as discussed below, other data 620, 691, 704, 825, user profile data, etc.

The context determination component 155 may provide the determined context to a subgraph generation component 195 and a trie generation component 160. As noted above, a trie is an ordered tree data structure that may be used to store associative data structures. The subgraph generation component 195 and the trie generation component 160 may use the context to retrieve data from the knowledge base 125. In some embodiments, the subgraph generation component 195 may retrieve data from the knowledge base 125 and provide the data to the trie generation component 160. The subgraph generation component 195 and/or the trie generation component 160 may receive the context data and determine (134) at least one document (e.g., the knowledge documents 165) from the knowledge base 125 that corresponds to the context. The information retrieved from the knowledge base 125 may be a subset of information held in the knowledge base 125 based on the determined context. The subgraph generation component 195 and/or the trie generation component 160 may retrieve the most relevant information records (e.g., news articles, Wikipedia pages, etc.), the knowledge documents 165, stored in the knowledge base 125 that correspond to the context. For example, the subgraph generation component 195 may be configured to retrieve the eight most relevant Wikipedia pages corresponding to the determined context. For example, and as illustrated in FIG. 1A, the knowledge documents 165 may comprise documents, or information records, for popular dog breeds based on the input text data 150.

The subgraph generation component 195 may generate (136) a subgraph 190 corresponding to the knowledge documents 165. In some embodiments, the subgraph 190 may be generated based on the knowledge documents 165. In some embodiments, a knowledge graph may be stored in (or in a manner associated with) the knowledge base 125 based on the documents, or information records, stored in the knowledge base 125. The subgraph 190 may be constructed from graph portions within the knowledge graph, with the graph portions corresponding to the knowledge documents 165.

The trie generation component 160 may generate a local trie 175. The local trie 175 may comprise triplets or other associated data groupings determined from the information in the selected knowledge documents 165. The local trie 175 uses a tree-based structure for efficient lookup of the triplets represented in the local trie 175. The trie generated by the trie generation component 160 may be considered a local trie as it is based on the selected knowledge documents 165, which is in contrast to a global trie that may be based on all or a significant portion of the knowledge base 125.

For each set of received input text data 150 the context determination component 155 may determine a context. Thus, a new context may be determined for each user input that is received. The subgraph generation component 195 and/or trie generation component 160 may, in turn, retrieve the knowledge documents 165 corresponding to each determined context. The trie generation component 160 may dynamically generate a local trie 175 based on the knowledge documents 165 corresponding to the context of each received input text data 150. In certain circumstances a local trie 175 may be re-used between user inputs, for example when a determined context for one user input is determined to be substantially similar to a previously determined context for a previous user input.

The trie generation component 160 may provide the local trie 175 and the subgraph generation component 195 may provide the subgraph 190 to the generative language model component 170. The context determination component 155 may provide context data to the generative language model component 170. The generative language model component 170 may generate (138) response data corresponding to the input text data 150 (e.g., question, inquiry, comment, etc.)

using a language generation model, where the input text data 150 and the subgraph 190 of the at least one document of the knowledge documents 165 are provided as input to the language generation model.

The generative language model component 170 may use a bidirectional autoregressive transformer (BART) model architecture as known in the art. The BART model architecture may use a sequence to sequence (seq2seq)/machine translation architecture with a bidirectional encoder, such as the bidirectional encoder representations from transformers (BERT) model, and a left-to-right decoder, as known in the art. A BART model may be pretrained with a large amount of text data to reconstruct a sentence based on a corrupted version of the sentence. The BART model architecture may be used to generate responsive data. Specifically, the model is directed to learn the conditional probability of the output y given the input x in an autoregressive manner, as represented by equation (1), with θ denotes the model's parameters:

$$p_\theta(y|x) = \prod_{i=1}^{|y|} p_\theta(y_i|y_{<i}, x) \qquad (1)$$

During the training of the generative language model, the objective is set to maximize the conditional log-likelihood of target sequences using the cross-entropy loss and label smoothing for regularization.

The generative language model component 170 may be trained with different subgraphs to generate a sentence level subgraph, or in other words, a sub-subgraph that corresponds to a sentence from input information (e.g., the knowledge documents 165). In some embodiments, the language generation model may traverse the subgraph 190 to determine a next potential edge or node of the subgraph 190 that is responsive to the input text data 150. For example, the language generation model may determine a set of potential nodes, representing a word, from the subgraph 190 and assign scores to each potential node. The scores may represent a confidence value based on the previously determined object and/or relation. The highest scoring potential node may be validated using the local trie 175.

The generative language model component 170 uses a trie-based constrained decoding approach to generate valid triplets of the subgraph 190 based on the knowledge documents 165. During the decoding process, the generative language model component 170 is constrained by what is represented in the local trie 175. The constraint applies to both the elements of the generated triplet (e.g., the object, the relation, and the subject) as well as multi-word entities (e.g., "North America," "United States Patent and Trademark Office," etc.). In this way the generative language model component 170 may be trained in a way so that at inference it does not generate output data that violates the runtime-provided knowledge documents 165.

At runtime, the generative language model component 170 may receive as input the input text data 150, the subgraph 190, and the local trie 175. The model of the generative language model component 170 may be trained using subgraphs to traverse the subgraph 190 and generate relevant triplets (e.g., subject, relation, and object) from the relationships defined by the subgraph 190 corresponding to the provided context data. The generative language model component 170 is thus trained to use the local trie 175 to constrain the results of the model to valid triplets.

The generative language model component 170 may traverse the subgraph 190 and generate a triplet (e.g., output sequence of related entities) in response to the input text data 150 using the subgraph 190 as the data source. The generative language model component 170 may determine (140) that the response data is represented in the at least one document. During the decoding, the triplet is validated using the local trie 175. For a given entity (e.g., subject of the triple), the model may generate a relation which is validated using the local trie 175 to determine if the relation is valid for the entity. Then, the generative language model component 170 may validate the object of the generated triplet against the definitions of the local trie 175. If either the relation or object of the generated triplet does not correspond to data, or item of information, represented in the local trie, then the generative language model component 170 generates another triplet. The model may be further trained based on the rejection of the triplet as being invalid.

If the generative language model component 170 determines, using the local trie 175, that the generated triplet is valid, (e.g., the triplet is present in the local trie 175), then the generative language model component 170 may identify a sentence corresponding to the valid triplet. The valid triplet, based on being validated against the local trie 175, corresponds to at least one sentence of the knowledge documents 165. The correspondence may be based on using linearized subgraphs of the sentences in the knowledge documents 165 and comparing the linearized subgraphs to the output sequence 180. The output sequence 180 illustrates an example sequence (e.g., triplet) generated by the model and validated against the local trie 175. The output sequence graph 185 illustrates the output sequence 180 in knowledge graph form. The output sequence graph 185 is a sub-subgraph of the subgraph 190 (e.g., dog breed subgraph 290). In response to determining that the response data is represented in the at least one document, a component, such as the dialog manager 472 or the NLG component 4 79, may generate (142) output text data based at least in part on the response data. As illustrated in FIGS. 4 and 7, the context determination component 155, trie generation component 160, and generative language model component 170 may be incorporated as part of the dialog manager 472. In some embodiments, the output sequence 180 may be sent to the NLG 479 to generate a natural language response to a user that incorporates information from the output sequence 180.

The generative language model with local trie constraints may be considered dynamic because if the grounded knowledge (e.g., knowledge base 125) and/or the knowledge graph representing the grounded knowledge changes, then the generative language model does not have to be retrained. Put another way, any changes made to the underlying knowledge source would result in updated information (e.g., knowledge documents 165) being provided at runtime. Thus, a particular generative language model component 170 would not be rendered stale or outdated as a result of changes to knowledge base 125. Additionally, the generation of the local trie is dynamic and thus includes any changes or updates to the knowledge base 125.

FIG. 1B is a conceptual diagram illustrating a virtual assistant system 100 for natural language processing and knowledge based information generation, according to embodiments of the present disclosure. As shown in FIG. 1B, the virtual assistant system 100 may include a voice-enabled device 110 local to a user 105, a natural language command processing system 120 (abbreviated "system component(s) 120"), and, in some embodiments, one or more skill support systems 425 (shown in FIG. 4) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 105. In some embodiments, the device 110 may process audio following detection of a wakeword. The device 110 may generate audio data corresponding to the audio input 111, and may send the audio data to the system component(s) 120. The device 110 may send the audio data to the system component(s) 120 via an application that is installed on the device 110 and associated with the system component(s) 120. An example of such an application is the Amazon Alexa application that may be installed on a smart phone, tablet, or the like. In some implementations, the device 110 may receive text data 413 corresponding to a natural language input originating from the user 105, and send the text data to the system component(s) 120. The device 110 may also receive output data from the system component(s) 120, and generate a synthesized speech output. The device 110 may include a camera for capturing image and/or video data for processing by the system component(s) 120. Examples of various devices 110 are further illustrated in FIG. 11. The system component(s) 120 may be remote system(s) such as a group of computing components located geographically remote from device 110 but accessible via network 199 (for example, servers accessible via the internet). The system component(s) 120 may also include a remote system that is physically separate from device 110 but located geographically close to device 110 and accessible via network 199 (for example a home server located in a same residence as device 110). System component(s) 120 may also include some combination thereof, for example where certain components/operations are performed via a home server(s) and others are performed via a geographically remote server(s).

The generative language model component 170 may include a language model that is a generative model. In some embodiments, the language model may be a large language model (LLM). An LLM is an advanced artificial intelligence system designed to process, understand, and generate human-like text based on massive amounts of data. An LLM may be built using deep learning techniques, such as neural networks, and may be trained on extensive datasets that include text (or other type of data) from a broad range of sources, such as books and websites, for natural language processing.

In some embodiments where the language model of the generative language model component 170 is an LLM, the language model may be a transformer-based seq2seq model involving an encoder-decoder architecture. In some such embodiments, the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model may be capable of in-context learning. An example of such a LLM is Alexa Teacher Model (Alexa™).

In embodiments where the language model of the generative language model component 170 is an LLM, the input (e.g., input text data 150) to the LLM may be in the form of a prompt. A prompt may be a natural language input, for example, an instruction, for the LLM to generate an output according to the prompt. The output generated by the LLM may be a natural language output responsive to the prompt.

The prompt and the output may be text in a particular language (e.g., English, Spanish, German, etc.). For example, for an example prompt "how do I cook rice?", the LLM may output a recipe (e.g., a step by step process) to cook rice. As another example, for an example prompt "I am hungry. What restaurants in the area are open?", the LLM may output a list of restaurants near the user that are open at the time.

Figure 2:
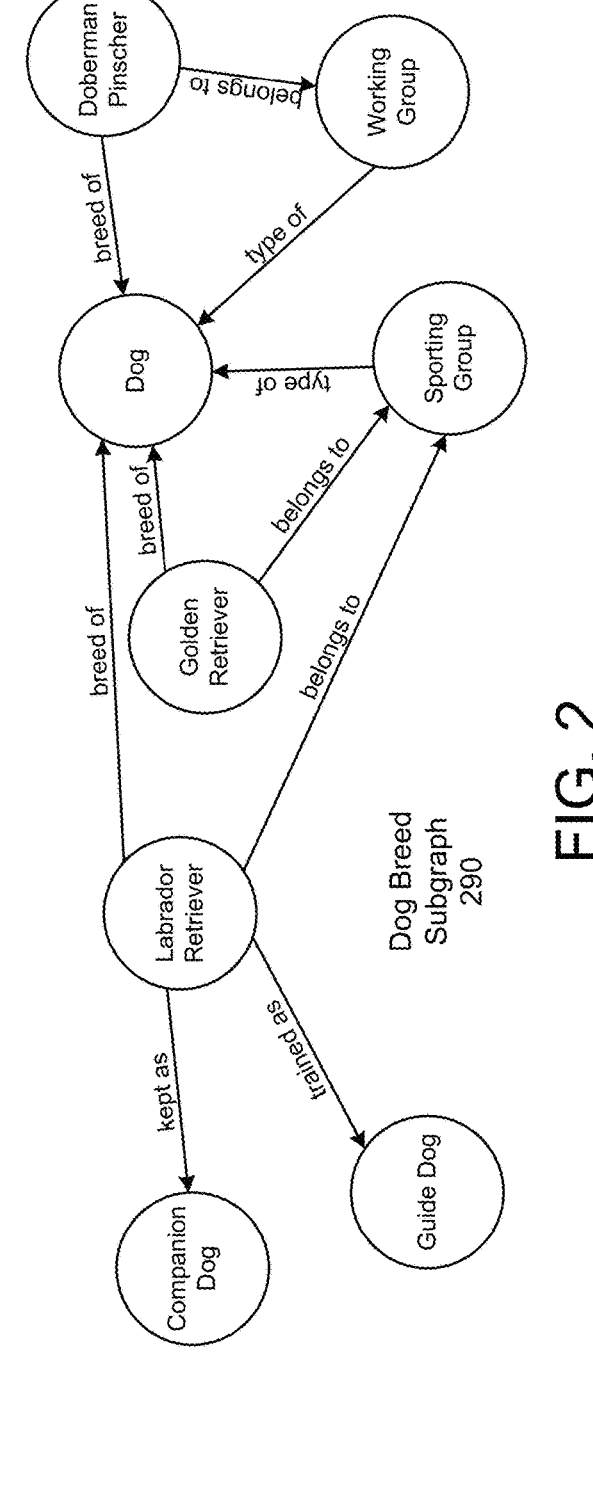
FIG. 2 illustrates a set of documents and a knowledge graph based on the set of documents, in accordance with some embodiments of the present disclosure.

FIG. 2 illustrates a set of documents and a knowledge graph based on the set of documents, in accordance with some embodiments. As shown in FIG. 1A, a user 105 may provide input audio 111 to request information, such as input text data 150 (e.g., "Tell me about different dog breeds"). The context determination component 155 may determine a context for the request. The context is then used by the subgraph generation component 195 and/or the trie generation component 160 to determine a set of relevant documents as the knowledge documents 165. The type of document (e.g., news article, book, research paper, etc.) may depend on the type of documents stored in the knowledge base 125. Additionally, the knowledge documents 165 may include multiple types of documents for a given context.

As shown in FIG. 2, the example dog breed knowledge documents 265 illustrate an example set of grounded documents identified by the trie generation component 160 as the knowledge documents 165. The subgraph generation component 195 may generate a subgraph 190, such as dog breed subgraph 290, from the dog breed knowledge documents 265. The dog breed subgraph 290 may be provided as input to the generative language model component 170. The trie generation component may generate a local trie 175 based on the example dog breed knowledge documents 265. As noted above, a trie is an ordered tree data structure that may be used to store associative data structures, such as the entities and relationships (e.g., items of information) found in the example dog breed knowledge documents 265.

During decoding, the local trie 175 may be used to determine valid inferences. For example, the generative language model component 170 may generate the subject "Labrador Retriever" and the relation "belongs to". The generative language model component 170 may then generate the object "Working Group" and validate the generated object against the local trie 175. The generative language model component 170 may determine, based on the local trie 175 representing the example dog breed knowledge documents 265, that the object "Working Group" is not valid for the previously determined subject and relation (e.g., "Labrador Retriever", "belongs to") and attempt to generate a new entity for the object. A similar validation process may be performed in the generation of multi-word elements. For example, the generative language model component 170 may generate during the decoding process "Doberman" and then generate "Retriever." The generative language model component 170 may validate "Doberman Retriever" against the local trie 175 and determine it is not a valid subject.

Figure 3A:
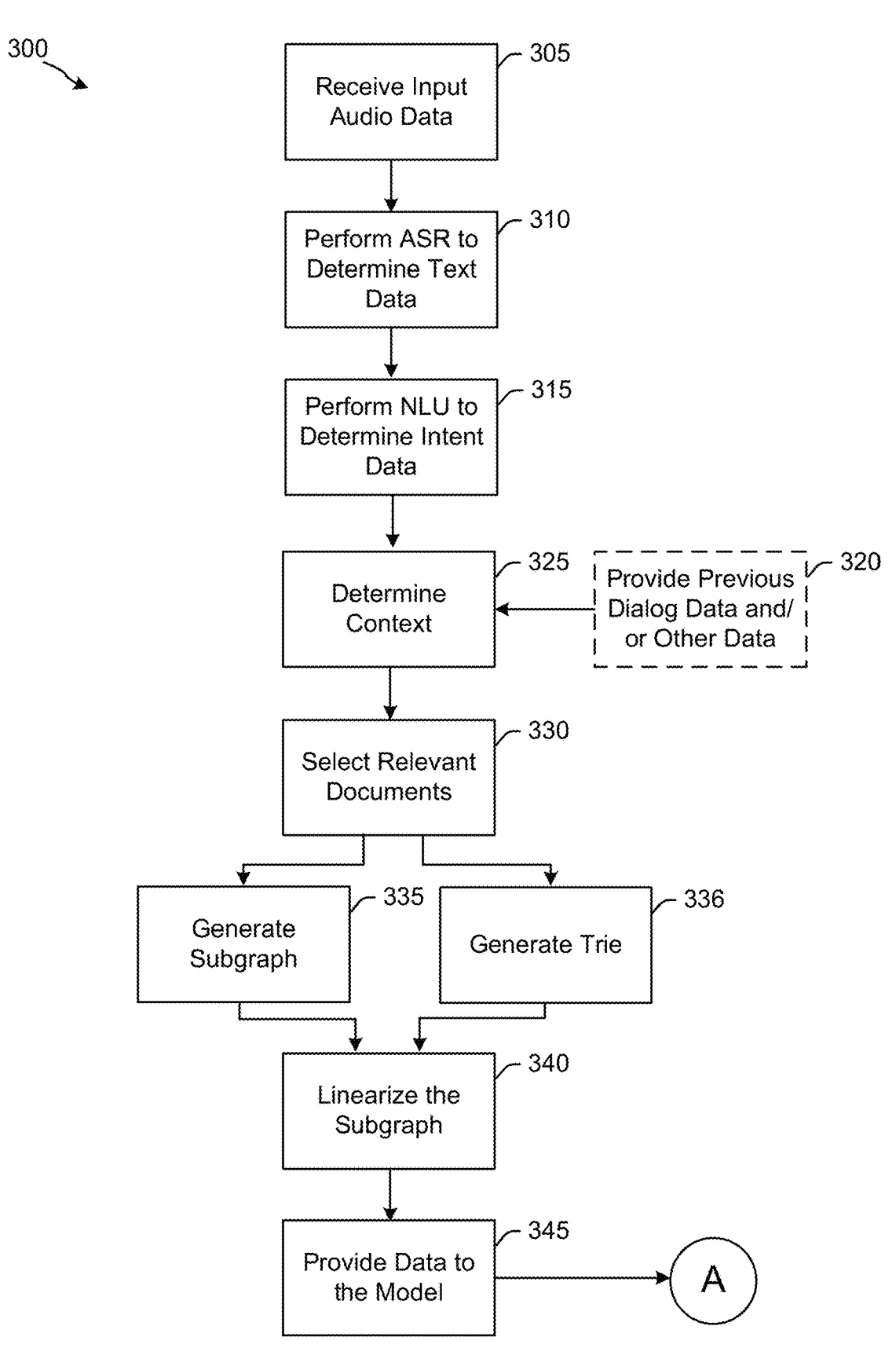
FIGS. 3A and 3B are a flow chart illustrating a process using a pretrained generative language model for knowledge retrieval via generation of knowledge sub-graphs, in accordance with some embodiments of the present disclosure.
Figure 3B:
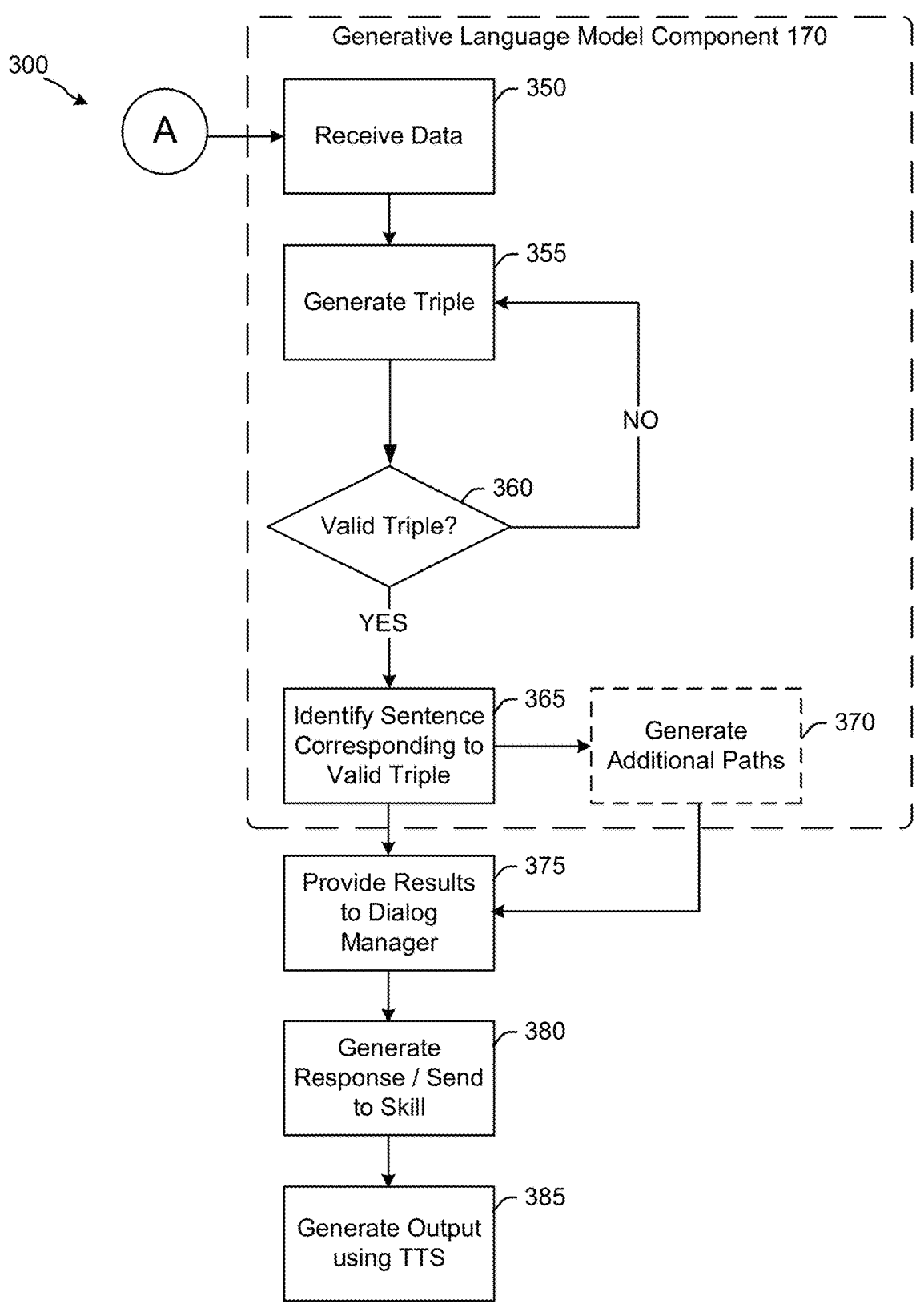

FIGS. 3A and 3B are a flow chart illustrating a process 300 using a pretrained generative language model for knowledge retrieval via generation of knowledge subgraphs, in accordance with some embodiments of the present disclosure. As illustrated in FIG. 3A, a system may receive (305) input audio 111 corresponding to a question, comment, and/or a request for information. The system may perform (310) speech recognition for the input audio 111 to obtain text data representing the speech of user 105. In some embodiments, the system may be configured to receive text inputs, such as input entered via a graphical user interface, and thus may be received as text data and bypassing operations 305 and 310.

In some embodiments, the system may perform (315) NLU processing to determine intent data corresponding to the text data. The intent data may represent that the input audio 111 indicates a question and/or request for information. The orchestrator 430 may receive the results of language processing 492, as described in detail below in reference to FIG. 4. The dialog manager 472 may receive the text data and determine one or more meanings associated with the phrase(s) or statement(s) represented in the text data based on words represented in the text data. The dialog manager 472 may determine a goal corresponding to an action that a user desires be performed, as described below in reference to FIGS. 4 and 7.

The dialog manager 472 may determine, based on the text data and/or intent data, that the user 105 is asking a question and/or requesting information. The dialog manager 472 may direct the text data and/or intent data to the context determination component 155.

In some embodiments, the context determination component 155, subgraph generation component 195, the trie generation component 160, and generative language model component 170 may be a part of one or more application programming interface(s) (API). The system 100 may call functions from the APIs corresponding to at least one of the context determination component 155, subgraph generation component 195, the trie generation component 160, and/or generative language model component 170 as described in reference to FIG. 1A.

The context determination component 155 may request prior dialog data from the dialog storage 730. If previous dialog data corresponding to the user 105 exists, then the context determination component 155 may receive (320) previous dialog data for the user 105/user profile and/or other data. The previous dialog data may include previous user input from the present dialog session and/or data corresponding to previous dialog sessions. The dialog storage 730 may store the previous dialog data.

The context determination component 155 may determine (325), using the text data and/or intent data and, if available, previous dialog data, a context, or subject matter, for the input audio 111. The context determination component 155 may operate similarly to the dialog manager 472 described below in reference to FIG. 7. The context determination component 155 may utilize the entity resolver 770 in determining the context. In some embodiments, the entity resolver 770 may operate similarly to NER component 562 and/or entity resolution component 670 described in reference to FIGS. 5 and 6 with regard to NLU operations.

The subgraph generation component 195 and/or the trie generation component 160 may receive the context from the context determination component 155. The subgraph generation component 195 and/or the trie generation component 160 may select (330) a set of documents (e.g., knowledge documents 165) from the knowledge base 125 that are relevant to the context. The type of documents may depend upon the context and type of documents stored in the knowledge base 125. The subgraph generation component 195 may generate (335) a subgraph 190 based on the knowledge documents 165, such as that described above. The subgraph generation component 195 may identify entities that appear in two or more of the knowledge documents 165 and build a subgraph 190 of triplets based on the collected data of the knowledge documents 165.

In some embodiments, the subgraph 190 may be extracted from a preexisting knowledge graph. For example, Wikidata includes a knowledge graph representative of the information found in the documents of Wikipedia (e.g., individual Wikipedia pages). The subgraph 190 may be based on subgraphs corresponding to each document of the knowledge documents 165 extracted from the knowledge graph. Thus, in such embodiments, the subgraph generation component 195 may retrieve the subgraph 190 instead of generating a subgraph.

In some embodiments, the subgraph 190 may be limited to the information contained with the set of documents comprising the knowledge documents 165. In other words, the terminating nodes of the subgraphs comprise entities included in the knowledge documents 165. In some embodiments, the subgraph 190 may expand to include documents in the knowledge base 125 that are linked or connected to the knowledge documents 165. A limit may be placed on the expansion of the subgraph 190, such as limiting the number of hops beyond a node representing an entity found in the knowledge documents 165.

The subgraph generation component 195 may linearize (340) the subgraph 190 generated from the knowledge documents 165. In some embodiments, the subgraph 190, as illustrated by the dog breed subgraph 290 in FIG. 2, may comprise one or more triplets (subject, relation, object) with entities as the nodes and the relation as the edges. The subgraph generation component 195 may linearize the subgraph 190 into sequences so that it may fit the sequence-to-sequence architecture of the generative language model component 170. For example, the subgraph 190 may be linearized using special tokens, such as <sub> for the start of the subject entity, <rel> for the relation type, and <obj> for the object entity of each triplet, as well as an additional special token <et> to indicate the end of the triplet sequence. In the process of generating the subgraph 190 of triplets from the knowledge documents 165 or from a knowledge graph traversal, the interdependence among triplets may be considered. An entity that appears as the tail in one triplet may appear as the head in another triplet. Therefore, it may be beneficial to ensure a consistent ordering of the target triplets to capture such interdependence during the subgraph linearization. The entity nodes appearing in the target subgraph may be sorted based on their in-degree values (e.g., the number of edges coming into a vertex or node) in a decreasing order. A higher in-degree value may suggest that the entity is more likely to be visited from other entities, thus indicating the significance of the node and more significant nodes may be visited first. Subsequently, starting from each unvisited and sorted entity node, a depth-first search (DFS) traversal may be performed on unvisited entity nodes to generate different paths. These paths may then be concatenated to create a single sequence, which serves as the target sequence for the generative model of the generative language model component 170 to learn.

Additionally, for each document of the knowledge documents 165, the trie generation component 160 may generate (336) a trie for the document. The local trie 175 may comprise the tries generated for the documents of the knowledge documents 165. The tries are constructed dynamically based on the grounded knowledge document and thus represent current and valid triplets for each inference of the generative language model component 170. The trie may include the triplets for a given grounded document where a traversal from the root to a leaf node leads to a valid and complete triplet.

The input text data 150, the subgraph 190, and the local trie 175 may be provided (345) to the generative language model component 170. The generative language model component 170 may receive (350) the input text data 150, the subgraph 190, and the local trie 175 and begin inference. The model of the generative language model component 170 may be trained using subgraphs to traverse the subgraph 190 and generate relevant triples (e.g., subject, relation, and object) from the relationships defined by the subgraph 190 based on the provided context data. The language model may determine one or more edges and/or nodes represented in the subgraph 190 and determine confidence value scores corresponding to the one or more edges and/or nodes. Thus, the possibility exists for the model to generate invalid triples (e.g., "lemonade, is made from, apples"). The generative language model component 170 uses the local trie 175 to constrain the traversal of the subgraph 190 by the model to generate valid triples. (e.g., the triples of the local trie 175).

The generative language model component 170 may generate (355) a triplet (e.g., output sequence) corresponding to the input text data 150 using the subgraph 190 as the data source. During the decoding, the triplet is validated (360) using the local trie 175. For a given entity (e.g., subject of the triple), the model may generate a relation which is validated using the items of information of the local trie 175 to determine if the relation is valid for the entity. Then, the generative language model component 170 may validate the object of the generated triplet against the definitions of the local trie 175. If either the relation or object of the generated triplet does not correspond to an item of information represented in the local trie, then the process returns to generate (355) another triple. The model may be further trained based on the rejection of the triplet as being invalid.

If, at the validation (360) of the triple, the generative language model component 170 determines, using the local trie 175, that the generated triplet is valid, (e.g., the triplet is present in the local trie 175), then the generative language model component 170 may identify (365) a sentence corresponding to the valid triple. The valid triple, based on being validated against the local trie 175, corresponds to at least one sentence of the knowledge documents 165. The correspondence may be based on using linearized subgraphs of the sentences in the knowledge documents 165. The selection of the at least one sentence from the knowledge documents 165 may be calculated based on the similarity between each candidate sentence of the documents and the valid triple. The generative language model component 170 may select the sentence that has the highest similarity to the valid triplet.

In some embodiments, the generative language model component 170 may take previous object as the new subject of a triplet and continue the generative process for a relation and object based on the new subject. In some embodiments, the generative language model component 170 may generate (370) additional paths from the valid triplet, such as information that might drive the dialog forward. The generative language model component 170 may, based on the valid triplet, generate additional sequences (triplets) to identify interesting or relevant triplets. The paths of these additional sequence may create a sub-subgraph from the knowledge documents 165.

The at least one sentence from the knowledge documents 165 corresponding to the valid triplet, or a subgraph sequence representing that sentence, may be output from the generative language model component 170 and provided (375) as the results to the dialog manager 472.

As described in reference to FIGS. 4 and 7, the dialog manager may use the results to generate (380) a response to the input text data 150. In some embodiments, the results may be sent (380) to a skill component 490 for further processing or performance of an action. The dialog manager 472 may direct the response to the language output component 493 to generate (385) output using TTS, as described in reference to FIG. 8.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 111 and creates corresponding audio data. Once speech is detected in audio data representing the audio 111, the device 110 may determine if the speech is directed at the device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 918 of the device 110 and may send image data 421 representing those image(s) to the system component(s) 120. The image data 421 may include raw image data or image data processed by the device 110 before sending to the system component(s) 120. The image data 421 may be used in various manners by different components of the system to perform operations such as determining whether a user is directing an utterance to the system, interpreting a user command, responding to a user command, etc.

The wakeword detector 420 of the device 110 may process the audio data, representing the audio 111, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 111, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 420 and/or input is detected by an input detector, the device 110 may "wake" and begin transmitting audio data 411, representing the audio 111, to the system component(s) 120. The audio data 411 may include data corresponding to the wakeword; in other embodiments, the portion of the audio corresponding to the wakeword is removed by the device 110 prior to sending the audio data 411 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 420 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill(s) 490 of one or more system components 120.

Upon receipt by the system component(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 492. The language processing component 492 (sometimes also referred to as a spoken language understanding (SLU) component) includes an automatic speech recognition (ASR) component 450 and a natural language understanding (NLU) component 460. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The speech processing system 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the device 110, the system component(s) 120, a skill component 490, a skill system(s) 425, etc.) to execute the intent. For example, if the text data corresponds to "play the $5^{th}$ Symphony by Beethoven," the NLU component 460 may determine an intent that the system output music and may identify "Beethoven" as an artist/composer and "$5^{th}$ Symphony" as the piece of music to be played. For further example, if the text data corresponds to "what is the weather," the NLU component 460 may determine an intent that the system output weather information associated with a geographic location of the device 110. In another example, if the text data corresponds to "turn off the lights," the NLU component 460 may determine an intent that the system turn off lights associated with the device 110 or the user 105. However, if the NLU component 460 is unable to resolve the entity—for example, because the entity is referred to by anaphora such as "this song" or "my next appointment"—the speech processing system 492 can send a decode request to another speech processing system 492 for information regarding the entity mention and/or other context related to the utterance. The speech processing system 492 may augment, correct, or base results data upon the audio data 411 as well as any data received from the other speech processing system 492.

The NLU component 460 may return NLU results data 685/625 (which may include tagged text data, indicators of intent, etc.) back to the orchestrator 430. The orchestrator 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data 685/625 includes an N-best list of NLU hypotheses, the NLU component 460 and the orchestrator component 430 may direct the top scoring NLU hypothesis to a skill component(s) 490 associated with the top scoring NLU hypothesis. The system may also include a post-NLU ranker 665 which may incorporate other information to rank potential interpretations determined by the NLU component 460. The NLU component 460, post-NLU ranker 665 and other components are described in greater detail below with regard to FIGS. 5 and 6.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system(s) 425 may communicate with a skill component(s) 490 within the system component(s) 120 and/or directly with the orchestrator component 430 or with other components. A skill support system(s) 425 may be configured to perform one or more actions. An ability to perform such action(s) may sometimes be referred to as a "skill." That is, a skill may enable a skill support system(s) 425 to execute specific functionality in order to provide data or perform some other action requested by a user. For example, a weather service skill may enable a skill support system(s) 425 to provide weather information to the system component(s) 120, a car service skill may enable a skill support system(s) 425 to book a trip with respect to a taxi or ride sharing service, an order pizza skill may enable a skill support system(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 490 dedicated to interacting with the skill support system(s) 425. Unless expressly stated otherwise, reference to a skill, skill device, or skill component may include a skill component 490 operated by the system component(s) 120 and/or skill operated by the skill support system(s) 425. Moreover, the functionality described herein as a skill or skill may be referred to using many different terms, such as an action, bot, app, or the like. The skill 490 and or skill support system(s) 425 may return output data to the orchestrator 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 472 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 472 may associate a dialog session identifier with the dialog upon identifying that the user is engaging in a dialog with the user. The dialog manager component 472 may track a user input and the corresponding system generated response to the user input as a turn. The dialog session identifier may correspond to multiple turns of user input and corresponding system generated response. The dialog manager component 472 may transmit data identified by the dialog session identifier directly to the orchestrator component 430 or other component. Depending on system configuration the dialog manager 472 may determine the appropriate system generated response to give to a particular utterance or user input of a turn. Or creation of the system generated response may be managed by another component of the system (e.g., the language output component 493, NLG 479, orchestrator 430, etc.) while the dialog manager 472 selects the appropriate responses. Alternatively, another component of the system component(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 472 may receive the ASR hypothesis/hypotheses (i.e., text data) and make a semantic interpretation of the phrase(s) or statement(s) represented therein. That is, the dialog manager 472 determines one or more meanings associated with the phrase(s) or statement(s) represented in the text data based on words represented in the text data. The dialog manager 472 determines a goal corresponding to an action that a user desires be performed as well as pieces of the text data that allow a device (e.g., the device 110, the system component(s) 120, a skill 490, a skill system(s) 425, etc.) to execute the intent. If, for example, the text data corresponds to "what is the weather," the dialog manager 472 may determine that that the system component(s) 120 is to output weather information associated with a geographic location of the device 110. In another example, if the text data corresponds to "turn off the lights," the dialog manager 472 may determine that the system component(s) 120 is to turn off lights associated with the device(s) 110 or the user(s) 105.

The dialog manager 472 may include the context determination component 155, trie generation component 160, and generative language model component 170 to generate responses to user inquiries using the generative language model with local trie constraints described herein.

The dialog manager 472 may send the results data to one or more skill(s) 490. If the results data includes a single hypothesis, the orchestrator component 430 may send the results data to the skill(s) 490 associated with the hypothesis. If the results data includes an N-best list of hypotheses, the orchestrator component 430 may send the top scoring hypothesis to a skill(s) 490 associated with the top scoring hypothesis.

The system component(s) 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data 815 discussed below). Alternatively or in addition, the TTS component 480 may receive text data from a skill 490 or other system component for output.

The NLG component 479 may include a trained model. The NLG component 479 generates text data 815 from dialog data received by the dialog manager 472 such that the output text data 815 has a natural feel and, in some embodiments, includes words and/or phrases specifically formatted for a requesting individual. The NLG may use templates to formulate responses. And/or the NLG system may include models trained from the various templates for forming the output text data 815. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 411 representing the commands to the system component(s) 120 for processing, after which the system component(s) 120 may return output data that can cause the device 110 to engage its camera.

The user-recognition component 495 may take as input the audio data 411 and/or text data output by the ASR component 450. The user-recognition component 495 may perform user recognition by comparing audio characteristics in the audio data 411 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 100 (either on device 110, system component (s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIGS. 5 and 6 illustrates how the NLU component 460 may perform NLU processing. FIG. 5 is a conceptual diagram of how natural language processing is performed, according to embodiments of the present disclosure. And FIG. 6 is a conceptual diagram of how natural language processing is performed, according to embodiments of the present disclosure.

FIG. 5 illustrates how NLU processing is performed on text data. The NLU component 460 may process text data including several ASR hypotheses of a single user input. For example, if the ASR component 450 outputs text data including an n-best list of ASR hypotheses, the NLU component 460 may process the text data with respect to all (or a portion of) the ASR hypotheses represented therein.

The NLU component 460 may annotate text data by parsing and/or tagging the text data. For example, for the text data "tell me the weather for Seattle," the NLU component 460 may tag "tell me the weather for Seattle" as an <OutputWeather> intent as well as separately tag "Seattle" as a location for the weather information.

The NLU component 460 may include a shortlister component 550. The shortlister component 550 selects skills that may execute with respect to ASR output data 610 input to the NLU component 460 (e.g., applications that may execute with respect to the user input). The ASR output data 610 (which may also be referred to as ASR data 610) may include representations of text of an utterance, such as words, subword units, or the like. The shortlister component 550 thus limits downstream, more resource intensive NLU processes to being performed with respect to skills that may execute with respect to the user input.

Without a shortlister component 550, the NLU component 460 may process ASR output data 610 input thereto with respect to every skill of the system, either in parallel, in series, or using some combination thereof. By implementing a shortlister component 550, the NLU component 460 may process ASR output data 610 with respect to only the skills that may execute with respect to the user input. This reduces total compute power and latency attributed to NLU processing.

The shortlister component 550 may include one or more trained models. The model(s) may be trained to recognize various forms of user inputs that may be received by the system component(s) 120. For example, during a training period skill system(s) 425 associated with a skill may provide the system component(s) 120 with training text data representing sample user inputs that may be provided by a user to invoke the skill. For example, for a ride sharing skill, a skill system(s) 425 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 550 may be trained, using the training text data representing sample user inputs, to determine other potentially related user input structures that users may try to use to invoke the particular skill. During training, the system component(s) 120 may solicit the skill system(s) 425 associated with the skill regarding whether the determined other user input structures are permissible, from the perspective of the skill system(s) 425, to be used to invoke the skill. The alternate user input structures may be derived by one or more trained models during model training and/or may be based on user input structures provided by different skills. The skill system(s) 425 associated with a particular skill may also provide the system component(s) 120 with training text data indicating grammar and annotations. The system component(s) 120 may use the training text data representing the sample user inputs, the determined related user input(s), the grammar, and the annotations to train a model (s) that indicates when a user input is likely to be directed to/handled by a skill, based at least in part on the structure of the user input. Each trained model of the shortlister component 550 may be trained with respect to a different skill. Alternatively, the shortlister component 550 may use one trained model per domain, such as one trained model for skills associated with a weather domain, one trained model for skills associated with a ride sharing domain, etc.

The system component(s) 120 may use the sample user inputs provided by a skill system(s) 425, and related sample user inputs potentially determined during training, as binary examples to train a model associated with a skill associated with the skill system(s) 425. The model associated with the particular skill may then be operated at runtime by the shortlister component 550. For example, some sample user inputs may be positive examples (e.g., user inputs that may be used to invoke the skill). Other sample user inputs may be negative examples (e.g., user inputs that may not be used to invoke the skill).

As described above, the shortlister component 550 may include a different trained model for each skill of the system, a different trained model for each domain, or some other combination of trained model(s). For example, the shortlister component 550 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 550 to output indications of only a portion of the skills that the ASR output data 610 may relate to. For example, a user input may correspond to "tell me about Tom Collins." If the model is clustered based on domain, the shortlister component 550 may determine the user input corresponds to a recipe skill (e.g., a drink recipe) even though the user input may also correspond to an information skill (e.g., including information about a person named Tom Collins).

The NLU component 460 may include one or more recognizers 563. In at least some embodiments, a recognizer 563 may be associated with a skill system 425 (e.g., the recognizer may be configured to interpret text data to correspond to the skill system 425). In at least some other examples, a recognizer 563 may be associated with a domain such as smart home, video, music, weather, custom, etc. (e.g., the recognizer may be configured to interpret text data to correspond to the domain).

If the shortlister component 550 determines ASR output data 610 is potentially associated with multiple domains, the recognizers 563 associated with the domains may process the ASR output data 610, while recognizers 563 not indicated in the shortlister component 550's output may not process the ASR output data 610. The "shortlisted" recognizers 563 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 563 may include a named entity recognition (NER) component 562. The NER component 562 attempts to identify grammars and lexical information that may be used to construe meaning with respect to text data input therein. The NER component 562 identifies portions of text data that correspond to a named entity associated with a domain, associated with the recognizer 563 implementing the NER component 562. The NER component 562 (or other component of the NLU component 460) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar database 576, a particular set of intents/actions 574, and a particular personalized lexicon 586. The grammar databases 576, and intents/actions 574 may be stored in an NLU storage 573. Each gazetteer 584 may include domain/skill-indexed lexical information associated with a particular user and/or device 110. For example, a Gazetteer A (584a) includes skill-indexed lexical information 586aa to 586an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 562 applies grammar information 576 and lexical information 586 associated with a domain (associated with the recognizer 563 implementing the NER component 562) to determine a mention of one or more entities in text data. In this manner, the NER component 562 identifies "slots" (each corresponding to one or more particular words in text data) that may be useful for later processing. The NER component 562 may also label each slot with a type (e.g., noun, place, city, artist name, song name, etc.).

Each grammar database 576 includes the names of entities (i.e., nouns) commonly found in speech about the particular domain to which the grammar database 576 relates, whereas the lexical information 586 is personalized to the user and/or the device 110 from which the user input originated. For example, a grammar database 576 associated with a shopping domain may include a database of words commonly used when people discuss shopping.

A downstream process called entity resolution (discussed in detail elsewhere herein) links a slot of text data to a specific entity known to the system. To perform entity resolution, the NLU component 460 may utilize gazetteer information (584a-584n) stored in an entity library storage 582. The gazetteer information 584 may be used to match text data (representing a portion of the user input) with text data representing known entities, such as song titles, contact names, etc. Gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 parses text data to determine an intent(s) (associated with the domain associated with the recognizer 563 implementing the IC component 564) that potentially represents the user input. An intent represents to an action a user desires be performed. An IC component 564 may communicate with a database 574 of words linked to intents. For example, a music intent database may link words and phrases such as "quiet," "volume off," and "mute" to a <Mute> intent. An IC component 564 identifies potential intents by comparing words and phrases in text data (representing at least a portion of the user input) to the words and phrases in an intents database 574 (associated with the domain that is associated with the recognizer 563 implementing the IC component 564).

The intents identifiable by a specific IC component 564 are linked to domain-specific (i.e., the domain associated with the recognizer 563 implementing the IC component 564) grammar frameworks 576 with "slots" to be filled. Each slot of a grammar framework 576 corresponds to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 identifies "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

The shortlister component 550 may receive ASR output data 610 output from the ASR component 450 or output from the device 110b (as illustrated in FIG. 6). The ASR component 450 may embed the ASR output data 610 into a form processable by a trained model(s) using sentence embedding techniques as known in the art. Sentence embedding results in the ASR output data 610 including text in a structure that enables the trained models of the shortlister component 550 to operate on the ASR output data 610. For example, an embedding of the ASR output data 610 may be a vector representation of the ASR output data 610.

The shortlister component 550 may make binary determinations (e.g., yes or no) regarding which domains relate to the ASR output data 610. The shortlister component 550 may make such determinations using the one or more trained models described herein above. If the shortlister component 550 implements a single trained model for each domain, the shortlister component 550 may simply run the models that are associated with enabled domains as indicated in a user profile associated with the device 110 and/or user that originated the user input.

The shortlister component 550 may generate n-best list data 615 representing domains that may execute with respect to the user input represented in the ASR output data 610. The size of the n-best list represented in the n-best list data 615 is configurable. In an example, the n-best list data 615 may indicate every domain of the system as well as contain an indication, for each domain, regarding whether the domain is likely capable to execute the user input represented in the ASR output data 610. In another example, instead of indicating every domain of the system, the n-best list data 615 may only indicate the domains that are likely to be able to execute the user input represented in the ASR output data 610. In yet another example, the shortlister component 550 may implement thresholding such that the n-best list data 615 may indicate no more than a maximum number of domains that may execute the user input represented in the ASR output data 610. In an example, the threshold number of domains that may be represented in the n-best list data 615 is ten. In another example, the domains included in the n-best list data 615 may be limited by a threshold a score, where only domains indicating a likelihood to handle the user input is above a certain score (as determined by processing the ASR output data 610 by the shortlister component 550 relative to such domains) are included in the n-best list data 615.

The ASR output data 610 may correspond to more than one ASR hypothesis. When this occurs, the shortlister component 550 may output a different n-best list (represented in the n-best list data 615) for each ASR hypothesis. Alternatively, the shortlister component 550 may output a single n-best list representing the domains that are related to the multiple ASR hypotheses represented in the ASR output data 610.

As indicated above, the shortlister component 550 may implement thresholding such that an n-best list output therefrom may include no more than a threshold number of entries. If the ASR output data 610 includes more than one ASR hypothesis, the n-best list output by the shortlister component 550 may include no more than a threshold number of entries irrespective of the number of ASR hypotheses output by the ASR component 450. Alternatively or in addition, the n-best list output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 550 may generate confidence scores representing likelihoods that domains relate to the ASR output data 610. If the shortlister component 550 implements a different trained model for each domain, the shortlister component 550 may generate a different confidence score for each individual domain trained model that is run. If the shortlister component 550 runs the models of every domain when ASR output data 610 is received, the shortlister component 550 may generate a different confidence score for each domain of the system. If the shortlister component 550 runs the models of only the domains that are associated with skills indicated as enabled in a user profile associated with the device 110 and/or user that originated the user input, the shortlister component 550 may only generate a different confidence score for each domain associated with at least one enabled skill. If the shortlister component 550 implements a single trained model with domain specifically trained portions, the shortlister component 550 may generate a different confidence score for each domain who's specifically trained portion is run. The shortlister component 550 may perform matrix vector modification to obtain confidence scores for all domains of the system in a single instance of processing of the ASR output data 610.

N-best list data 615 including confidence scores that may be output by the shortlister component 550 may be represented as, for example:

Search domain, 0.67
    Recipe domain, 0.62
    Information domain, 0.57
    Shopping domain, 0.42

As indicated, the confidence scores output by the shortlister component 550 may be numeric values. The confidence scores output by the shortlister component 550 may alternatively be binned values (e.g., high, medium, low).

The n-best list may only include entries for domains having a confidence score satisfying (e.g., equaling or exceeding) a minimum threshold confidence score. Alternatively, the shortlister component 550 may include entries for all domains associated with user enabled skills, even if one or more of the domains are associated with confidence scores that do not satisfy the minimum threshold confidence score.

The shortlister component 550 may consider other data 620 when determining which domains may relate to the user input represented in the ASR output data 610 as well as respective confidence scores. The other data 620 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 620 may include an indicator of the user associated with the ASR output data 610, for example as determined by the user recognition component 495.

The other data 620 may be character embedded prior to being input to the shortlister component 550. The other data 620 may alternatively be embedded using other techniques known in the art prior to being input to the shortlister component 550.

The other data 620 may also include data indicating the domains associated with skills that are enabled with respect to the device 110 and/or user that originated the user input. The shortlister component 550 may use such data to determine which domain-specific trained models to run. That is, the shortlister component 550 may determine to only run the trained models associated with domains that are associated with user-enabled skills. The shortlister component 550 may alternatively use such data to alter confidence scores of domains.

As an example, considering two domains, a first domain associated with at least one enabled skill and a second domain not associated with any user-enabled skills of the user that originated the user input, the shortlister component 550 may run a first model specific to the first domain as well as a second model specific to the second domain. Alternatively, the shortlister component 550 may run a model configured to determine a score for each of the first and second domains. The shortlister component 550 may determine a same confidence score for each of the first and second domains in the first instance. The shortlister component 550 may then alter those confidence scores based on which domains is associated with at least one skill enabled by the present user. For example, the shortlister component 550 may increase the confidence score associated with the domain associated with at least one enabled skill while leaving the confidence score associated with the other domain the same. Alternatively, the shortlister component 550 may leave the confidence score associated with the domain associated with at least one enabled skill the same while decreasing the confidence score associated with the other domain. Moreover, the shortlister component 550 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 470. When the shortlister component 550 receives the ASR output data 610, the shortlister component 550 may determine whether profile data associated with the user and/or device 110 that originated the command includes an indication of enabled skills.

The other data 620 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 550 may use such data to determine which domain-specific trained models to run. For example, if the device 110 corresponds to a displayless type device, the shortlister component 550 may determine not to run trained models specific to domains that output video data. The shortlister component 550 may alternatively use such data to alter confidence scores of domains.

As an example, considering two domains, one that outputs audio data and another that outputs video data, the shortlister component 550 may run a first model specific to the domain that generates audio data as well as a second model specific to the domain that generates video data. Alternatively the shortlister component 550 may run a model configured to determine a score for each domain. The shortlister component 550 may determine a same confidence score for each of the domains in the first instance. The shortlister component 550 may then alter the original confidence scores based on the type of the device 110 that originated the user input corresponding to the ASR output data 610. For example, if the device 110 is a displayless device, the shortlister component 550 may increase the confidence score associated with the domain that generates audio data while leaving the confidence score associated with the domain that generates video data the same. Alternatively, if the device 110 is a displayless device, the shortlister component 550 may leave the confidence score associated with the domain that generates audio data the same while decreasing the confidence score associated with the domain that generates video data. Moreover, if the device 110 is a displayless device, the shortlister component 550 may increase the confidence score associated with the domain that generates audio data as well as decrease the confidence score associated with the domain that generates video data.

The type of device information represented in the other data 620 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 620 may represent the smart TV of other display device, and not the displayless device that captured the spoken user input.

The other data 620 may also include data indicating the user input originating device's speed, location, or other mobility information. For example, the device may correspond to a vehicle including a display. If the vehicle is moving, the shortlister component 550 may decrease the confidence score associated with a domain that generates video data as it may be undesirable to output video content to a user while the user is driving. The device may output data to the system component(s) 120 indicating when the device is moving.

The other data 620 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 550 may use such data to alter confidence scores of domains. For example, the shortlister component 550 may run a first model specific to a first domain as well as a second model specific to a second domain. Alternatively, the shortlister component 550 may run a model configured to determine a score for each domain. The shortlister component 550 may also determine a same confidence score for each of the domains in the first instance. The shortlister component 550 may then alter the original confidence scores based on the first domain being invoked to cause the system to output content while the current user input was received. Based on the first domain being invoked, the shortlister component 550 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 615 generated by the shortlister component 550 as well as the different types of other data 620 considered by the shortlister component 550 are configurable. For example, the shortlister component 550 may update confidence scores as more other data 620 is considered. For further example, the n-best list data 615 may exclude relevant domains if thresholding is implemented. Thus, for example, the shortlister component 550 may include an indication of a domain in the n-best list 615 unless the shortlister component 550 is one hundred percent confident that the domain may not execute the user input represented in the ASR output data 610 (e.g., the shortlister component 550 determines a confidence score of zero for the domain).

The shortlister component 550 may send the ASR output data 610 to recognizers 563 associated with domains represented in the n-best list data 615. Alternatively, the shortlister component 550 may send the n-best list data 615 or some other indicator of the selected subset of domains to another component (such as the orchestrator component 430) which may in turn send the ASR output data 610 to the recognizers 563 corresponding to the domains included in the n-best list data 615 or otherwise indicated in the indicator. If the shortlister component 550 generates an n-best list representing domains without any associated confidence scores, the shortlister component 550/orchestrator component 430 may send the ASR output data 610 to recognizers 563 associated with domains that the shortlister component 550 determines may execute the user input. If the shortlister component 550 generates an n-best list representing domains with associated confidence scores, the shortlister component 550/orchestrator component 430 may send the ASR output data 610 to recognizers 563 associated with domains associated with confidence scores satisfying (e.g., meeting or exceeding) a threshold minimum confidence score.

A recognizer 563 may output tagged text data generated by an NER component 562 and an IC component 564, as described herein above. The NLU component 460 may compile the output tagged text data of the recognizers 563 into a single cross-domain n-best list 640 and may send the cross-domain n-best list 640 to a pruning component 650. Each entry of tagged text (e.g., each NLU hypothesis) represented in the cross-domain n-best list data 640 may be associated with a respective score indicating a likelihood that the NLU hypothesis corresponds to the domain associated with the recognizer 563 from which the NLU hypothesis was output. For example, the cross-domain n-best list data 640 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 650 may sort the NLU hypotheses represented in the cross-domain n-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may also or alternatively perform number of NLU hypothesis thresholding. For example, the pruning component 650 may select the top scoring NLU hypothesis(es). The pruning component 650 may output a portion of the NLU hypotheses input thereto. The purpose of the pruning component 650 is to create a reduced list of NLU hypotheses so that downstream, more resource intensive, processes may only operate on the NLU hypotheses that most likely represent the user's intent.

The NLU component 460 may include a light slot filler component 652. The light slot filler component 652 can take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., 572. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-domain n-best list data 660.

The cross-domain n-best list data 660 may be input to an entity resolution component 670. The entity resolution component 670 can apply rules or other instructions to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 can refer to a knowledge base (e.g., 572) that is used to specifically identify the precise entity referred to in each slot of each NLU hypothesis represented in the cross-domain n-best list data 660. Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output an altered n-best list that is based on the cross-domain n-best list 660 but that includes more detailed information (e.g., entity IDs) about the specific entities mentioned in the slots and/or more detailed slot data that can eventually be used by a skill. The NLU component 460 may include multiple entity resolution components 670 and each entity resolution component 670 may be specific to one or more domains.

The NLU component 460 may include a reranker 690. The reranker 690 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, or other techniques. The reranker 690 may consider not only the data output by the entity resolution component 670, but may also consider other data 691. The other data 691 may include a variety of information. For example, the other data 691 may include skill rating or popularity data. For example, if one skill has a high rating, the reranker 690 may increase the score of a NLU hypothesis that may be processed by the skill. The other data 691 may also include information about skills that have been enabled by the user that originated the user input. For example, the reranker 690 may assign higher scores to NLU hypothesis that may be processed by enabled skills than NLU hypothesis that may be processed by non-enabled skills. The other data 691 may also include data indicating user usage history, such as if the user that originated the user input regularly uses a particular skill or does so at particular times of day. The other data 691 may additionally include data indicating date, time, location, weather, type of device 110, user identifier, context, as well as other information. For example, the reranker 690 may consider when any particular skill is currently active (e.g., music being played, a game being played, etc.).

As illustrated and described, the entity resolution component 670 is implemented prior to the reranker 690. The entity resolution component 670 may alternatively be implemented after the reranker 690. Implementing the entity resolution component 670 after the reranker 690 limits the NLU hypotheses processed by the entity resolution component 670 to only those hypotheses that successfully pass through the reranker 690.

The reranker 690 may be a global reranker (e.g., one that is not specific to any particular domain). Alternatively, the NLU component 460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 460 may perform NLU processing described above with respect to domains associated with skills wholly implemented as part of the system component(s) 120 (e.g., designated 490 in FIG. 4). The NLU component 460 may separately perform NLU processing described above with respect to domains associated with skills that are at least partially implemented as part of the skill system(s) 425. In an example, the shortlister component 550 may only process with respect to these latter domains. Results of these two NLU processing paths may be merged into NLU output data 685, which may be sent to a post-NLU ranker 665, which may be implemented by the system component(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 685, skill result data 630, and the other data 620 in order to output ranked output data 625. The ranked output data 625 may include an n-best list where the NLU hypotheses in the NLU results data 685 are reordered such that the n-best list in the ranked output data 625 represents a prioritized list of skills to respond to a user input as determined by the post-NLU ranker 665. The ranked output data 625 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 685 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 430) may solicit the first skill and the second skill to provide potential result data 630 based on the first NLU hypothesis and the second NLU hypothesis, respectively. For example, the post-NLU ranker 665 may send the first NLU hypothesis to the first skill 490a along with a request for the first skill 490a to at least partially execute with respect to the first NLU hypothesis. The post-NLU ranker 665 may also send the second NLU hypothesis to the second skill 490b along with a request for the second skill 490b to at least partially execute with respect to the second NLU hypothesis. The post-NLU ranker 665 receives, from the first skill 490a, first result data 630a generated from the first skill 490a's execution with respect to the first NLU hypothesis. The post-NLU ranker 665 also receives, from the second skill 490b, second results data 630b generated from the second skill 490b's execution with respect to the second NLU hypothesis.

The result data 630 may include various portions. For example, the result data 630 may include content (e.g., audio data, text data, and/or video data) to be output to a user. The result data 630 may also include a unique identifier used by the system component(s) 120 and/or the skill system(s) 425 to locate the data to be output to a user. The result data 630 may also include an instruction. For example, if the user input corresponds to "turn on the light," the result data 630 may include an instruction causing the system to turn on a light associated with a profile of the device (110a/110b) and/or user.

The post-NLU ranker 665 may consider the first result data 630a and the second result data 630b to alter the first confidence score and the second confidence score of the first NLU hypothesis and the second NLU hypothesis, respectively. That is, the post-NLU ranker 665 may generate a third confidence score based on the first result data 630a and the first confidence score. The third confidence score may correspond to how likely the post-NLU ranker 665 determines the first skill will correctly respond to the user input. The post-NLU ranker 665 may also generate a fourth confidence score based on the second result data 630b and the second confidence score. One skilled in the art will appreciate that a first difference between the third confidence score and the fourth confidence score may be greater than a second difference between the first confidence score and the second confidence score. The post-NLU ranker 665 may also consider the other data 620 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 630 associated with the skill 490 with the highest altered confidence score to be the data output in response to the current user input. The post-NLU ranker 665 may also consider the ASR output data 610 to alter the NLU hypotheses confidence scores.

The orchestrator component 430 may, prior to sending the NLU results data 685 to the post-NLU ranker 665, associate intents in the NLU hypotheses with skills 490. For example, if a NLU hypothesis includes a <PlayMusic> intent, the orchestrator component 430 may associate the NLU hypothesis with one or more skills 490 that can execute the <PlayMusic> intent. Thus, the orchestrator component 430 may send the NLU results data 685, including NLU hypotheses paired with skills 490, to the post-NLU ranker 665. In response to ASR output data 610 corresponding to "what should I do for dinner today," the orchestrator component 430 may generates pairs of skills 490 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 665 queries each skill 490, paired with a NLU hypothesis in the NLU output data 685, to provide result data 630 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skills 490 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 665 may query each of the skills 490 in parallel or substantially in parallel.

A skill 490 may provide the post-NLU ranker 665 with various data and indications in response to the post-NLU ranker 665 soliciting the skill 490 for result data 630. A skill 490 may simply provide the post-NLU ranker 665 with an indication of whether or not the skill can execute with respect to the NLU hypothesis it received. A skill 490 may also or alternatively provide the post-NLU ranker 665 with output data generated based on the NLU hypothesis it received. In some situations, a skill 490 may need further information in addition to what is represented in the received NLU hypothesis to provide output data responsive to the user input. In these situations, the skill 490 may provide the post-NLU ranker 665 with result data 630 indicating slots of a framework that the skill 490 further needs filled or entities that the skill 490 further needs resolved prior to the skill 490 being able to provided result data 630 responsive to the user input. The skill 490 may also provide the post-NLU ranker 665 with an instruction and/or computer-generated speech indicating how the skill 490 recommends the system solicit further information needed by the skill 490. The skill 490 may further provide the post-NLU ranker 665 with an indication of whether the skill 490 will have all needed information after the user provides additional information a single time, or whether the skill 490 will need the user to provide various kinds of additional information prior to the skill 490 having all needed information. According to the above example, skills 490 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 630 includes an indication provided by a skill 490 indicating whether or not the skill 490 can execute with respect to a NLU hypothesis; data generated by a skill 490 based on a NLU hypothesis; as well as an indication provided by a skill 490 indicating the skill 490 needs further information in addition to what is represented in the received NLU hypothesis.

The post-NLU ranker 665 uses the result data 630 provided by the skills 490 to alter the NLU processing confidence scores generated by the reranker 690. That is, the post-NLU ranker 665 uses the result data 630 provided by the queried skills 490 to create larger differences between the NLU processing confidence scores generated by the reranker 690. Without the post-NLU ranker 665, the system may not be confident enough to determine an output in response to a user input, for example when the NLU hypotheses associated with multiple skills are too close for the system to confidently determine a single skill 490 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 490 that provide result data 630 responsive to NLU hypotheses over skills 490 that provide result data 630 corresponding to an indication that further information is needed, as well as skills 490 that provide result data 630 indicating they can provide multiple responses to received NLU hypotheses. For example, the post-NLU ranker 665 may generate a first score for a first skill 490*a* that is greater than the first skill's NLU confidence score based on the first skill 490*a* providing result data 630*a* including a response to a NLU hypothesis. For further example, the post-NLU ranker 665 may generate a second score for a second skill 490*b* that is less than the second skill's NLU confidence score based on the second skill 490*b* providing result data 630*b* indicating further information is needed for the second skill 490*b* to provide a response to a NLU hypothesis. Yet further, for example, the post-NLU ranker 665 may generate a third score for a third skill 490*c* that is less than the third skill's NLU confidence score based on the third skill 490*c* providing result data 630*c* indicating the third skill 490*c* can provide multiple responses to a NLU hypothesis.

The post-NLU ranker 665 may consider other data 620 in determining scores. The other data 620 may include rankings associated with the queried skills 490. A ranking may be a system ranking or a user-specific ranking. A ranking may indicate a veracity of a skill from the perspective of one or more users of the system. For example, the post-NLU ranker 665 may generate a first score for a first skill 490*a* that is greater than the first skill's NLU processing confidence score based on the first skill 490*a* being associated with a high ranking. For further example, the post-NLU ranker 665 may generate a second score for a second skill 490*b* that is less than the second skill's NLU processing confidence score based on the second skill 490*b* being associated with a low ranking.

The other data 620 may include information indicating whether or not the user that originated the user input has enabled one or more of the queried skills 490. For example, the post-NLU ranker 665 may generate a first score for a first skill 490*a* that is greater than the first skill's NLU processing confidence score based on the first skill 490*a* being enabled by the user that originated the user input. For further example, the post-NLU ranker 665 may generate a second score for a second skill 490*b* that is less than the second skill's NLU processing confidence score based on the second skill 490*b* not being enabled by the user that originated the user input. When the post-NLU ranker 665 receives the NLU results data 685, the post-NLU ranker 665 may determine whether profile data, associated with the user and/or device that originated the user input, includes indications of enabled skills.

The other data 620 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 620 may include information indicating the veracity of the result data 630 provided by a skill 490. For example, if a user says "tell me a recipe for pasta sauce," a first skill 490a may provide the post-NLU ranker 665 with first result data 630a corresponding to a first recipe associated with a five star rating and a second skill 490b may provide the post-NLU ranker 665 with second result data 630b corresponding to a second recipe associated with a one star rating. In this situation, the post-NLU ranker 665 may increase the NLU processing confidence score associated with the first skill 490a based on the first skill 490a providing the first result data 630a associated with the five star rating and/or decrease the NLU processing confidence score associated with the second skill 490b based on the second skill 490b providing the second result data 630b associated with the one star rating.

The other data 620 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 490a corresponding to a room service skill associated with the hotel and/or decrease the NLU processing confidence score associated with a second skill 490b corresponding to a food skill not associated with the hotel.

The other data 620 may include information indicating a location of the device and/or user that originated the user input. The system may be configured with skills 490 that may only operate with respect to certain geographic locations. For example, a user may provide a user input corresponding to "when is the next train to Portland." A first skill 490a may operate with respect to trains that arrive at, depart from, and pass through Portland, Oregon. A second skill 490b may operate with respect to trains that arrive at, depart from, and pass through Portland, Maine. If the device and/or user that originated the user input is located in Seattle, Washington, the post-NLU ranker 665 may increase the NLU processing confidence score associated with the first skill 490a and/or decrease the NLU processing confidence score associated with the second skill 490b. Likewise, if the device and/or user that originated the user input is located in Boston, Massachusetts, the post-NLU ranker 665 may increase the NLU processing confidence score associated with the second skill 490b and/or decrease the NLU processing confidence score associated with the first skill 490a.

The other data 620 may include information indicating a time of day. The system may be configured with skills 490 that operate with respect to certain times of day. For example, a user may provide a user input corresponding to "order me food." A first skill 490a may generate first result data 630a corresponding to breakfast. A second skill 490b may generate second result data 630b corresponding to dinner. If the system component(s) 120 receives the user input in the morning, the post-NLU ranker 665 may increase the NLU processing confidence score associated with the first skill 490a and/or decrease the NLU processing score associated with the second skill 490b. If the system component(s) 120 receives the user input in the afternoon or evening, the post-NLU ranker 665 may increase the NLU processing confidence score associated with the second skill 490b and/or decrease the NLU processing confidence score associated with the first skill 490a.

The other data 620 may include information indicating user preferences. The system may include multiple skills 490 configured to execute in substantially the same manner. For example, a first skill 490a and a second skill 490b may both be configured to order food from respective restaurants.

The system may store a user preference (e.g., in the profile storage 470) that is associated with the user that provided the user input to the system component(s) 120 as well as indicates the user prefers the first skill 490a over the second skill 490b. Thus, when the user provides a user input that may be executed by both the first skill 490a and the second skill 490b, the post-NLU ranker 665 may increase the NLU processing confidence score associated with the first skill 490a and/or decrease the NLU processing confidence score associated with the second skill 490b.

The other data 620 may include information indicating system usage history associated with the user that originated the user input. For example, the system usage history may indicate the user originates user inputs that invoke a first skill 490a more often than the user originates user inputs that invoke a second skill 490b. Based on this, if the present user input may be executed by both the first skill 490a and the second skill 490b, the post-NLU ranker 665 may increase the NLU processing confidence score associated with the first skill 490a and/or decrease the NLU processing confidence score associated with the second skill 490b.

The other data 620 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 665 may increase the NLU processing confidence score associated with a first skill 490a that generates audio data. The post-NLU ranker 665 may also or alternatively decrease the NLU processing confidence score associated with a second skill 490b that generates image data or video data.

The other data 620 may include information indicating how long it took a skill 490 to provide result data 630 to the post-NLU ranker 665. When the post-NLU ranker 665 multiple skills 490 for result data 630, the skills 490 may respond to the queries at different speeds. The post-NLU ranker 665 may implement a latency budget. For example, if the post-NLU ranker 665 determines a skill 490 responds to the post-NLU ranker 665 within a threshold amount of time from receiving a query from the post-NLU ranker 665, the post-NLU ranker 665 may increase the NLU processing confidence score associated with the skill 490. Conversely, if the post-NLU ranker 665 determines a skill 490 does not respond to the post-NLU ranker 665 within a threshold amount of time from receiving a query from the post-NLU ranker 665, the post-NLU ranker 665 may decrease the NLU processing confidence score associated with the skill 490.

It has been described that the post-NLU ranker 665 uses the other data 620 to increase and decrease NLU processing confidence scores associated with various skills 490 that the post-NLU ranker 665 has already requested result data from. Alternatively, the post-NLU ranker 665 may use the other data 620 to determine which skills 490 to request result data from. For example, the post-NLU ranker 665 may use the other data 620 to increase and/or decrease NLU processing confidence scores associated with skills 490 associated with the NLU results data 685 output by the NLU component 460. The post-NLU ranker 665 may select n-number of top scoring altered NLU processing confidence scores. The post-NLU ranker 665 may then request result data 630 from only the skills 490 associated with the selected n-number of NLU processing confidence scores.

As described, the post-NLU ranker 665 may request result data 630 from all skills 490 associated with the NLU results data 685 output by the NLU component 460. Alternatively, the system component(s) 120 may prefer result data 630 from skills implemented entirely by the system component(s) 120 rather than skills at least partially implemented by the skill system(s) 425. Therefore, in the first instance, the post-NLU ranker 665 may request result data 630 from only skills associated with the NLU results data 685 and entirely implemented by the system component(s) 120. The post-NLU ranker 665 may only request result data 630 from skills associated with the NLU results data 685, and at least partially implemented by the skill system(s) 425, if none of the skills, wholly implemented by the system component(s) 120, provide the post-NLU ranker 665 with result data 630 indicating either data response to the NLU results data 685, an indication that the skill can execute the user input, or an indication that further information is needed.

As indicated above, the post-NLU ranker 665 may request result data 630 from multiple skills 490. If one of the skills 490 provides result data 630 indicating a response to a NLU hypothesis and the other skills provide result data 630 indicating either they cannot execute or they need further information, the post-NLU ranker 665 may select the result data 630 including the response to the NLU hypothesis as the data to be output to the user. If more than one of the skills 490 provides result data 630 indicating responses to NLU hypotheses, the post-NLU ranker 665 may consider the other data 620 to generate altered NLU processing confidence scores, and select the result data 630 of the skill associated with the greatest score as the data to be output to the user.

A system that does not implement the post-NLU ranker 665 may select the highest scored NLU hypothesis in the NLU results data 685. The system may send the NLU hypothesis to a skill 490 associated therewith along with a request for output data. In some situations, the skill 490 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 685 to provide result data 630 to the post-NLU ranker 665 prior to the post-NLU ranker 665 ultimately determining the skill 490 to be invoked to respond to the user input. Some of the skills 490 may provide result data 630 indicating responses to NLU hypotheses while other skills 490 may providing result data 630 indicating the skills cannot provide responsive data. Whereas a system not implementing the post-NLU ranker 665 may select one of the skills 490 that could not provide a response, the post-NLU ranker 665 only selects a skill 490 that provides the post-NLU ranker 665 with result data corresponding to a response, indicating further information is needed, or indicating multiple responses can be generated.

The post-NLU ranker 665 may select result data 630, associated with the skill 490 associated with the highest score, for output to the user. Alternatively, the post-NLU ranker 665 may output ranked output data 625 indicating skills 490 and their respective post-NLU ranker rankings. Since the post-NLU ranker 665 receives result data 630, potentially corresponding to a response to the user input, from the skills 490 prior to post-NLU ranker 665 selecting one of the skills or outputting the ranked output data 625, little to no latency occurs from the time skills provide result data 630 and the time the system outputs responds to the user.

If the post-NLU ranker 665 selects result audio data to be output to a user and the system determines content should be output audibly, the post-NLU ranker 665 (or another component of the system component(s) 120) may cause the device 110a and/or the device 110b to output audio corresponding to the result audio data. If the post-NLU ranker 665 selects result text data to output to a user and the system determines content should be output visually, the post-NLU ranker 665 (or another component of the system component(s) 120) may cause the device 110b to display text corresponding to the result text data. If the post-NLU ranker 665 selects result audio data to output to a user and the system determines content should be output visually, the post-NLU ranker 665 (or another component of the system component(s) 120) may send the result audio data to the ASR component 450. The ASR component 450 may generate output text data corresponding to the result audio data. The system component(s) 120 may then cause the device 110b to display text corresponding to the output text data. If the post-NLU ranker 665 selects result text data to output to a user and the system determines content should be output audibly, the post-NLU ranker 665 (or another component of the system component(s) 120) may send the result text data to the TTS component 480. The TTS component 480 may generate output audio data (corresponding to computer-generated speech) based on the result text data. The system component(s) 120 may then cause the device 110a and/or the device 110b to output audio corresponding to the output audio data.

As described, a skill 490 may provide result data 630 either indicating a response to the user input, indicating more information is needed for the skill 490 to provide a response to the user input, or indicating the skill 490 cannot provide a response to the user input. If the skill 490 associated with the highest post-NLU ranker score provides the post-NLU ranker 665 with result data 630 indicating a response to the user input, the post-NLU ranker 665 (or another component of the system component(s) 120, such as the orchestrator component 430) may simply cause content corresponding to the result data 630 to be output to the user. For example, the post-NLU ranker 665 may send the result data 630 to the orchestrator component 430. The orchestrator component 430 may cause the result data 630 to be sent to the device (110a/110b), which may output audio and/or display text corresponding to the result data 630. The orchestrator component 430 may send the result data 630 to the ASR component 450 to generate output text data and/or may send the result data 630 to the TTS component 480 to generate output audio data, depending on the situation.

The skill 490 associated with the highest post-NLU ranker score may provide the post-NLU ranker 665 with result data 630 indicating more information is needed as well as instruction data. The instruction data may indicate how the skill 490 recommends the system obtain the needed information. For example, the instruction data may correspond to text data or audio data (i.e., computer-generated speech) corresponding to "please indicate." The instruction data may be in a format (e.g., text data or audio data) capable of being output by the device (110a/110b). When this occurs, the post-NLU ranker 665 may simply cause the received instruction data be output by the device (110a/110b). Alternatively, the instruction data may be in a format that is not capable of being output by the device (110a/110b). When this occurs, the post-NLU ranker 665 may cause the ASR component 450 or the TTS component 480 to process the instruction data, depending on the situation, to generate instruction data that may be output by the device (110a/110b). Once the user provides the system with all further information needed by the skill 490, the skill 490 may provide the system with result data 630 indicating a response to the user input, which may be output by the system as detailed above.

The system may include "informational" skills 490 that simply provide the system with information, which the system outputs to the user. The system may also include "transactional" skills 490 that require a system instruction to execute the user input. Transactional skills 490 include ride sharing skills, flight booking skills, etc. A transactional skill 490 may simply provide the post-NLU ranker 665 with result data 630 indicating the transactional skill 490 can execute the user input. The post-NLU ranker 665 may then cause the system to solicit the user for an indication that the system is permitted to cause the transactional skill 490 to execute the user input. The user-provided indication may be an audible indication or a tactile indication (e.g., activation of a virtual button or input of text via a virtual keyboard). In response to receiving the user-provided indication, the system may provide the transactional skill 490 with data corresponding to the indication. In response, the transactional skill 490 may execute the command (e.g., book a flight, book a train ticket, etc.). Thus, while the system may not further engage an informational skill 490 after the informational skill 490 provides the post-NLU ranker 665 with result data 630, the system may further engage a transactional skill 490 after the transactional skill 490 provides the post-NLU ranker 665 with result data 630 indicating the transactional skill 490 may execute the user input.

FIG. 7 illustrate operations to handle dialog management, according to embodiments of the present disclosure. One or more components shown in FIG. 7 may be part of the dialog manager 472. For example, the dialog manager 472 may include the entity resolver 770, the focus data component 716 and the action selector 718. The dialog manager 472 may work in concert with other language processing components, for example NLU 460, or may operate instead of such components in certain embodiments. In some embodiments and as described herein, the dialog manager 472 may include the context determination component 155, the trie generation component 160, and the generative language model component 170.

The system receives input text data 150 which may be received, for example, by a device (e.g., 413) or from another component of the system (for example as ASR output data 610). The input text data 150 may include text corresponding to a user input and metadata indicating further information about the text (such as an identity of the user for example determined by user recognition component 495), an emotional state of the user. The input text data 150 may be text representing words, instructions, markup language, speech, or gestures, or may be a vector or other representation of the same. The input text data 150 may be generated by a user via a keyboard, touchscreen, microphone, camera, or other such input device. In other embodiments, the input text data 150 is created using ASR, as described above, from audio data received from a user. The system may further receive other input data 704, which may correspond to a button press, gesture, or other input, such as image data as may interpreted by device 110, system component(s) 120, or other component. As described in greater detail below, using the input text data 150 and/or other input data 704, the system may determine and output text data 815 and/or other output data 708. The system may instead or in addition perform an action based on the input text data 150 and/or other input data 704, such as calling one or more APIs 710.

An entity resolver 770 may be used to determine that the input text data 150 includes a representation of one or more entities, a process that may include named entity recognition (NER)—i.e., determining that the input text data 150 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 770 may operate similarly to NER component 562 and/or entity resolution component 670 discussed herein with regard to NLU operations.

In some embodiments, a single entity resolver 770 is used for more than one domain (i.e., a "cross-domain" entity resolver 770). Each domain may correspond to one or more dialog models. One or more candidate domains corresponding to the input text data 770 may be determined; entity resolvers 770 corresponding to the candidate domains may be used to process the input text data 770. The dialog focus data 716 may store the output entities from each candidate domain and may remove unselected entities when an API 710 is selected or an action to be performed is determined.

The dialog focus data 716 may store state data (for example in dialog storage 730) corresponding to dialog history data (including an intent(s), an entity (ies), etc. corresponding to a prior turn in the dialog), action history data, and/or other data. In some embodiments, the other components (e.g., the action selector 718) do not store state data and instead query the dialog focus data 716 for the state data. The system may send some or all of the dialog focus data 716 to other systems and/or may receive additional dialog focus data from other systems. In some embodiments, the other components (e.g., the action selector 718) include a feature-extractor component to extract features from the dialog focus data 716.

The dialog focus data 716 may be graph-based data including a plurality of graph nodes; each graph node may correspond to an item of state data, such as an entity type, entity value, prior API call, and/or user data. The other components, such as the action selector 718, may access all of the graph nodes of the dialog focus data 716 or may access only a subset of the graph nodes of the dialog focus data 716. The dialog focus data 716 may be any type of storage mechanism and may serve as long-term and/or short term memory for the system, thus enabling tracking of entities, ASR output, TTS output, and other features) at each turn through a dialog. In some embodiments, the dialog focus data 716 is updated after each turn of dialog with updated dialog focus data; in other embodiments, the dialog focus data 716 is updated after an end of a dialog is determined.

The entity resolver 770 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 490 (e.g., a shopping skill, a music skill, a video skill, etc.), or may be organized in a variety of other ways.

The entity resolver 770 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 770.

The focus data 716 may store data relevant to a dialog. In various embodiments, the dialog focus data 716 stores the input text data 150, other input data 704, entity data from the entity resolver 770 and/or action data and dialog data from an action selector 718. The dialog focus data 716 may further include additional information, such as location data, user preference data, and environment data. In various embodiments, the dialog focus data 716 uses an encoder to encode some or all of the received data into one or more feature vectors and a decoder to determine, based on the feature vectors, intent data corresponding to an intent of a user. The dialog focus data 716 may further include state data that represents prior dialog, actions, or other prior user information or data.

The action selector 718 determines an action to be performed in response to the user request, where the action may include calling an API to perform an action and/or presenting an output to the user. The action selector 718 may include a trained model(s), and may process the dialog focus data 716. If the action selector 718 determines to invoke an API call, one or more APIs 710 may be activated and a corresponding action carried out. If the action selector 718 determines to present a prompt or other output data to the user, the NLG component 479 may be used to generate the output text data 815 and/or other output data 708. In either case, the action selection 718 may update the dialog focus data 716 based on the API call or the output presented to the user.

In some embodiments, the action selector 718 may process data from the dialog storage 730 to select one or more skills 490/skill system(s) 425 capable of responding to the user request, and present the selected skill to the user using the output text data 815.

In some embodiments, the system component(s) 120 may determine past interaction data, such as a satisfaction rating corresponding to skill(s) 490 and store it in the storage 730. The satisfaction rating may be based on past interactions between users of the system component(s) 120 and the skill. In some embodiments, the system component(s) 120 may determine a user-specific satisfaction rating corresponding to the skill based on user-specific data, interaction-specific data and/or focus data 716, such as, user profile data 470 associated with the specific user, location data, past user interactions with the system component(s) 120, past user interactions with the skill 490, user preferences, device type for the device 110 that received the user request, device type for the device 110 that may output/respond to the user request, device capabilities, dialog state of previous turns in the dialog, and other data.

In some embodiments, users may provide feedback to the system component(s) 120 or the skill system(s) 425 indicating the user's satisfaction in the service skill responding to the user request/performing an action in response to the user request. The feedback may be solicited by the system component(s) 120 or the skill system(s) 425. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 718 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 718 may select a skill based on skill availability, for example, a reservations at a restaurant may indicate availability or no availability for a particular day. The system component(s) 120/action selector 718 may determine the number of diners at a restaurant or the number of takeout orders a restaurant is handling based on the number of user requests the system component(s) 120 routed to the skill. In another example, the system component(s) 120/action selector 718 may determine that a number of user requests were routed to a first skill for a first location/geographic area (e.g., a city), and may determine to route the next/future user requests to another skill for that geographic area.

For a restaurant reservation, the action selector 718 may select a skill based on a number of people in the user's party, since some restaurants may not make reservations for small parties less than a particular number. The action selector 718 may select a skill based on person(s) other than the user that may be involved in the user request. For example, if the user says "Alexa, what should we do tomorrow?" the system component(s) 120 may determine information relating to the other persons in the user's household to select a skill.

The action selector 718 may select a skill based on the dialog state where the dialog state indicates multiple turns/attempts to recommend a skill/service provider, and the action selector 718 may modify the search criteria (e.g., expand the zip code, expand the time frame, etc.) to select a skill.

Figure 8:
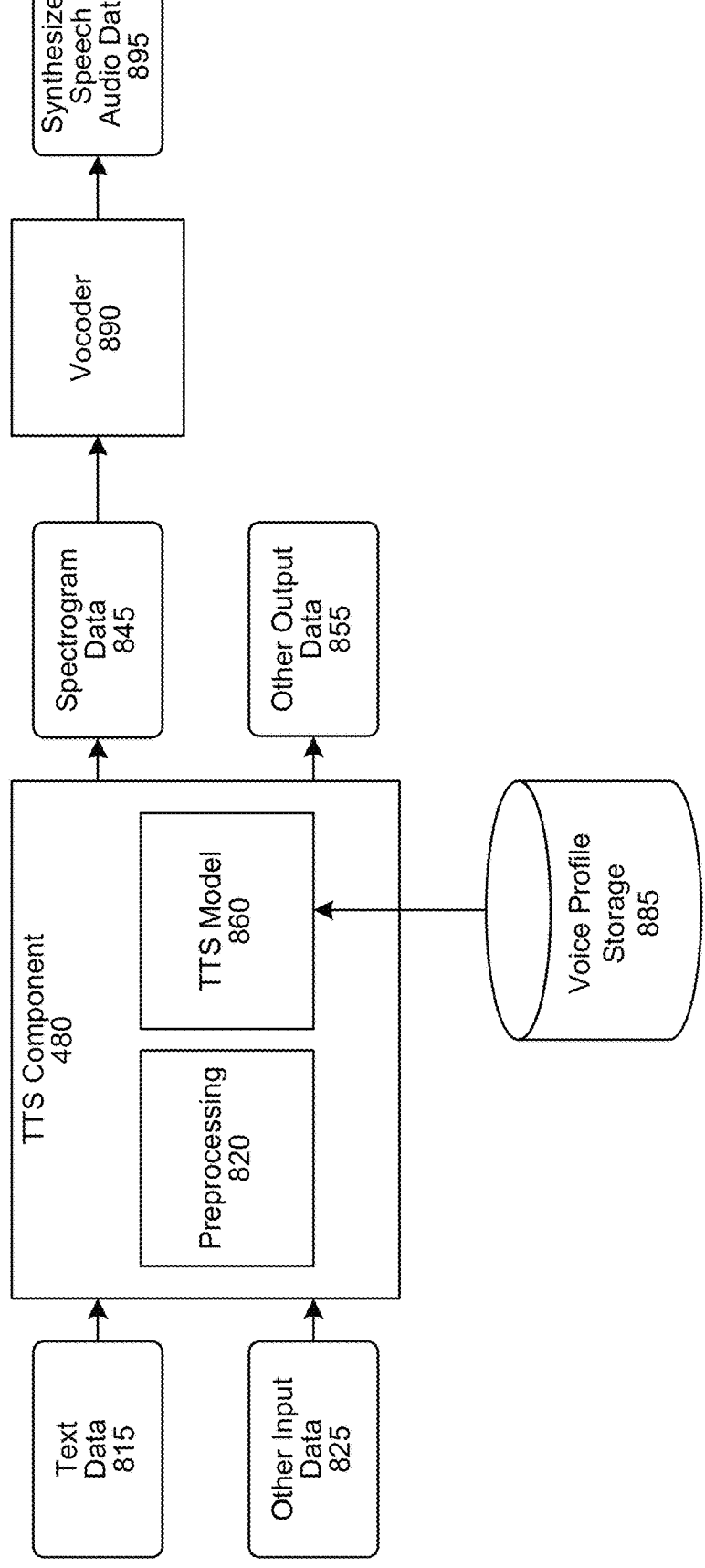
FIG. 8 is a conceptual diagram of text-to-speech components according to embodiments of the present disclosure.

Components of a system that may be used to perform unit selection, parametric TTS processing, and/or model-based audio synthesis are shown in FIG. 8. FIG. 8 is a conceptual diagram that illustrates operations for generating synthesized speech using a TTS component 480, according to embodiments of the present disclosure. The TTS component 480 may receive text data 815 and process it using one or more TTS models 860 to generate synthesized speech in the form of spectrogram data 845. A vocoder 890 may convert the spectrogram data 845 into output speech audio data 895, which may represent a time-domain waveform suitable for amplification and output as audio (e.g., from a loudspeaker).

The TTS component 480 may additionally receive other input data 825. The other input data 825 may include, for example, identifiers and/or labels corresponding to a desired speaker identity, voice characteristics, emotion, speech style, etc. desired for the synthesized speech. In some implementations, the other input data 825 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 815 and/or the other input data 825 such as metadata accompanying a TTS request and indicating what text should be whispered (or have some other indicated audio characteristic).

The TTS component 480 may include a preprocessing component 820 that can convert the text data 815 and/or other input data 825 into a form suitable for processing by the TTS model 860. The text data 815 may be from, for example an application, a skill component (described further below), an NLG component, another device or source, or may be input by a user. The text data 815 received by the TTS component 480 may not necessarily be text, but may include other data (such as symbols, code, other data, etc.) that may reference text (such as an indicator of a word and/or phoneme) that is to be synthesized. The preprocessing component 820 may transform the text data 815 into, for example, a symbolic linguistic representation, which may include linguistic context features such as phoneme data, punctuation data, syllable-level features, word-level features, and/or emotion, speaker, accent, or other features for processing by the TTS component 480. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 815, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 820 may include functionality and/or components for performing text normalization, linguistic analysis, linguistic prosody generation, or other such operations. During text normalization, the preprocessing component 820 may first process the text data 815 and generate standard text, converting such things as numbers, abbreviations (such as Apt., St., etc.), symbols ($, %, etc.) into the equivalent of written out words.

During linguistic analysis, the preprocessing component 820 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 860 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 820 may also identify different grammatical components such as prefixes, suffixes, phrases, punctuation, syntactic boundaries, or the like. Such grammatical components may be used by the TTS component 480 to craft a natural-sounding audio waveform output. The language dictionary may also include letter-to-sound rules and other tools that may be used to pronounce previously unidentified words or letter combinations that may be encountered by the TTS component 480. Generally, the more information included in the language dictionary, the higher quality the speech output.

The output of the preprocessing component 820 may be a symbolic linguistic representation, which may include a sequence of phonetic units. In some implementations, the sequence of phonetic units may be annotated with prosodic characteristics. In some implementations, prosody may be applied in part or wholly by a TTS model 860. This symbolic linguistic representation may be sent to the TTS model 860 for conversion into audio data (e.g., in the form of Mel-spectrograms or other frequency content data format).

The TTS component 480 may retrieve one or more previously trained and/or configured TTS models 860 from the voice profile storage 885. A TTS model 860 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 860 may be stored in the voice profile storage 885. A TTS model 860 may represent a particular speaker identity and may be conditioned based on speaking style, emotion, etc. In some implementations, a particular speaker identity may be associated with more than one TTS model 860; for example, with a different model representing a different speaking style, language, emotion, etc. in some implementations, a particular TTS model 860 may be associated with more than one speaker identity; that is, be able to produce synthesized speech that reproduces voice characteristics of more than one character. Thus a first TTS model 860a may be used to create synthesized speech for the first speech-processing system component 120a while a second, different, TTS model 860b may be used to create synthesized speech for the second speech-processing system component 120b. In some cases, the TTS model 860 may generate the desired voice characteristics based on conditioning data received or determined from the text data 815 and/or the other input data 825. For example a synthesized voice of the first speech-processing system component 120a may be different from a synthesized voice of the second speech-processing system component 120b.

The TTS component 480 may, based on an indication received with the text data 815 and/or other input data 825, retrieve a TTS model 860 from the voice profile storage 885 and use it to process input to generate synthesized speech. The TTS component 480 may provide the TTS model 860 with any relevant conditioning labels to generate synthesized speech having the desired voice characteristics. The TTS model 860 may generate spectrogram data 845 (e.g., frequency content data) representing the synthesized speech, and send it to the vocoder 890 for conversion into an audio signal.

The TTS component 480 may generate other output data 855. The other output data 855 may include, for example, indications or instructions for handling and/or outputting the synthesized speech. For example, the text data 815 and/or other input data 825 may be received along with metadata, such as SSML tags, indicating that a selected portion of the text data 815 should be louder or quieter. Thus, the other output data 855 may include a volume tag that instructs the vocoder 890 to increase or decrease an amplitude of the output speech audio data 895 at times corresponding to the selected portion of the text data 815. Additionally or alternatively, a volume tag may instruct a playback device to raise or lower a volume of the synthesized speech from the device's current volume level, or lower a volume of other media being output by the device (e.g., to deliver an urgent message).

The vocoder 890 may convert the spectrogram data 845 generated by the TTS model 860 into an audio signal (e.g., an analog or digital time-domain waveform) suitable for amplification and output as audio. The vocoder 890 may be, for example, a universal neural vocoder based on Parallel WaveNet or related model. The vocoder 890 may take as input audio data in the form of, for example, a Mel-spectrogram with 80 coefficients and frequencies ranging from 50 Hz to 12 kHz. The synthesized speech audio data 895 may be a time-domain audio format (e.g., pulse-code modulation (PCM), waveform audio format (WAV), u-law, etc.) that may be readily converted to an analog signal for amplification and output by a loudspeaker. The synthesized speech audio data 895 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
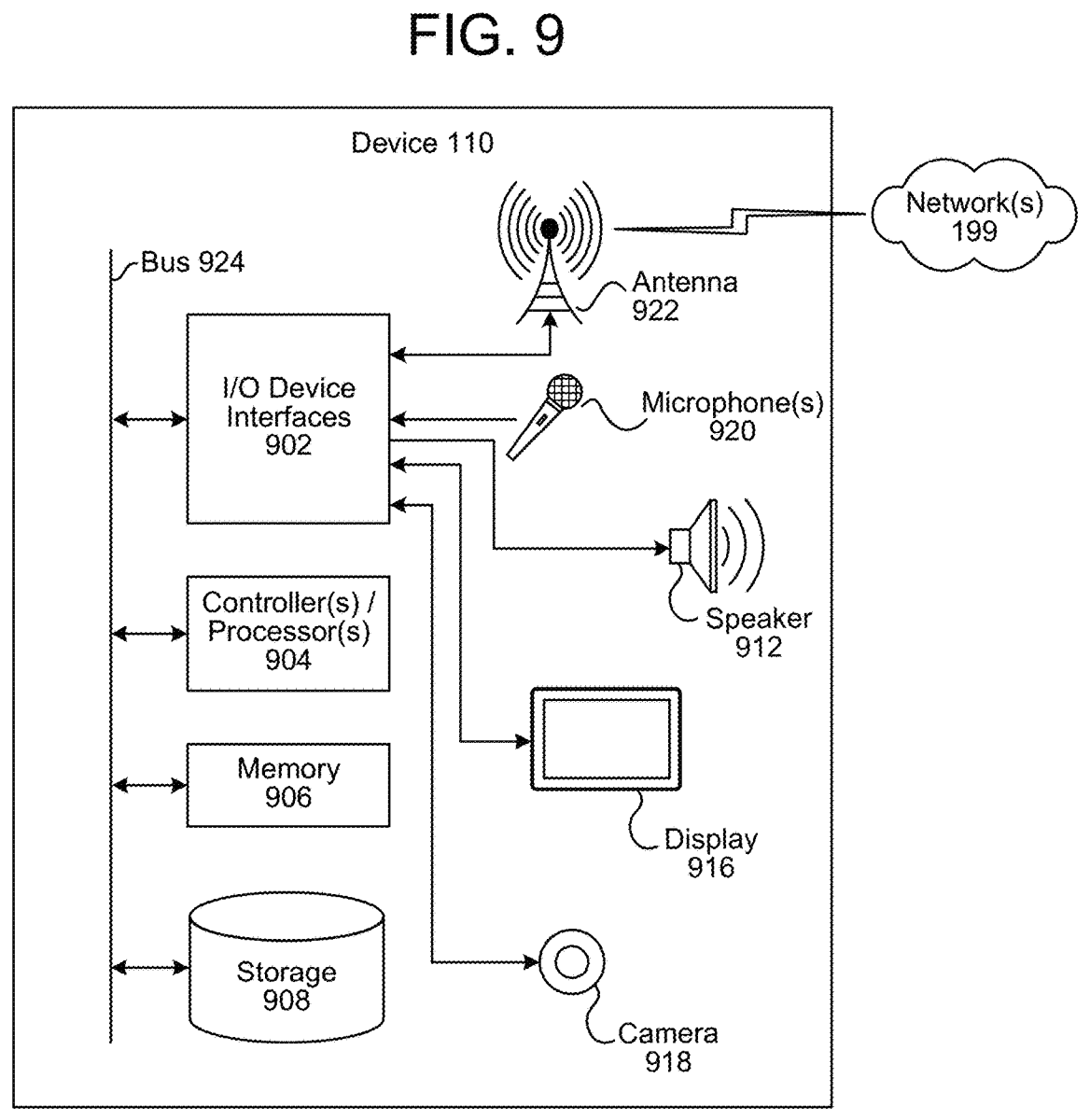
Figure 10:
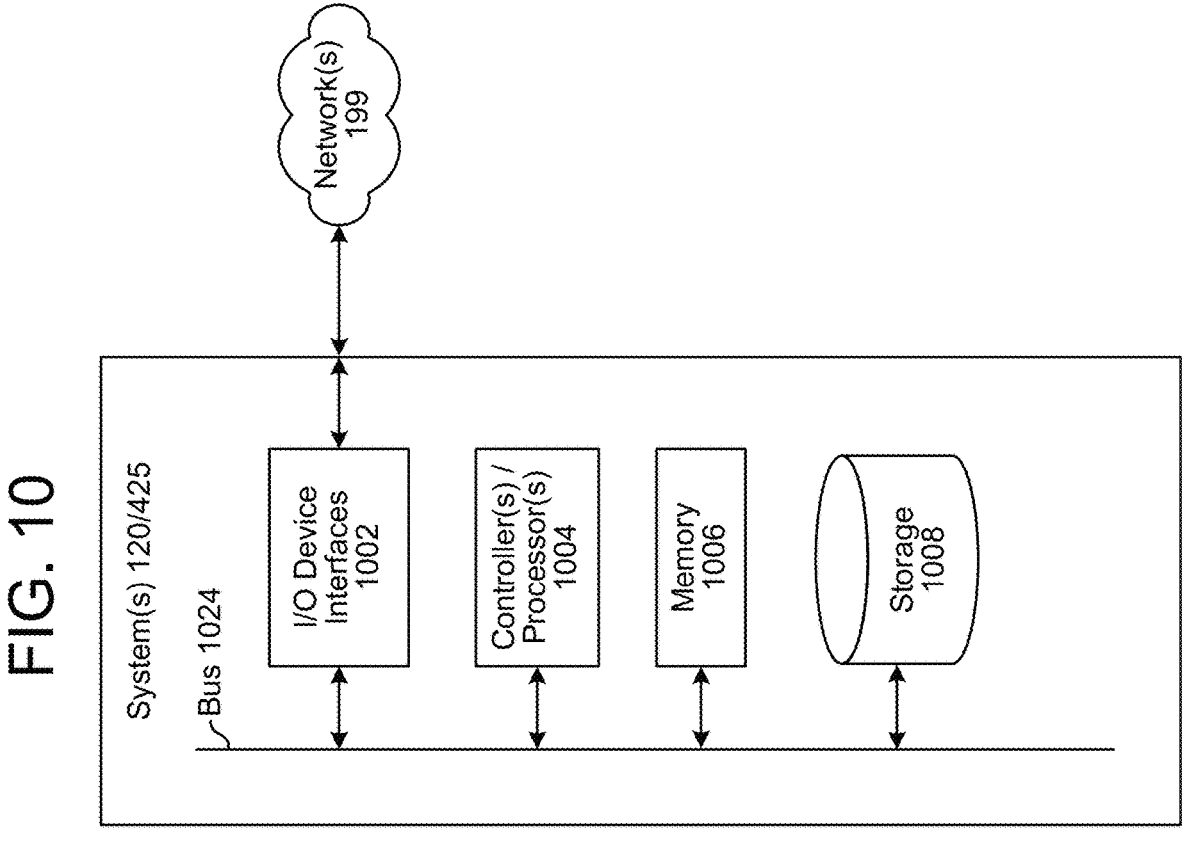
FIG. 10 is a block diagram conceptually illustrating example components of a system, according to embodiments of the present disclosure.

FIG. 9 is a block diagram conceptually illustrating a device 110 that may be used with the system. FIG. 10 is a block diagram conceptually illustrating example components of a remote device, such as the natural language command processing system component(s) 120, which may assist with ASR processing, NLU processing, etc., and a skill system 425. A system (120/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/425) may be included in the overall system 100 of the present disclosure, such as one or more natural language processing system components 120 for performing ASR processing, one or more natural language processing system components 120 for performing NLU processing, one or more skill systems 425, etc. In operation, each of these systems may include computer-readable and computer-executable instructions that reside on the respective device (120/425), as will be discussed further below.

Each of these devices (110/120/425) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/425) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/425) may also be connected to removable or external non-volatile memory and/or storage (such as a removable memory card, memory key drive, networked storage, etc.) through respective input/output device interfaces (902/1002).

Computer instructions for operating each device (110/120/425) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/425) includes input/output device interfaces (902/1002). A variety of components may be connected through the input/output device interfaces (902/1002), as will be discussed further below. Additionally, each device (110/120/425) may include an address/data bus (924/1024) for conveying data among components of the respective device. Each component within a device (110/120/425) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language command processing system component(s) 120, or a skill system 425 may include their own dedicated processors, memory, and/or storage. Alternatively, one or more of the components of the device(s) 110, the natural language command processing system component(s) 120, or a skill system 425 may utilize the I/O interfaces (902/1002), processor(s) (904/1004), memory (906/1006), and/or storage (908/1008) of the device(s) 110, natural language command processing system component(s) 120, or the skill system 425, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 425, as described herein, are illustrative, and may be located as a stand-alone device or may be included, in whole or in part, as a component of a larger device or system. As can be appreciated, a number of components may exist either on a system component(s) 120 and/or on device 110. For example, language processing 492 (which may include ASR 450), language output 493 (which may include NLG 479 and TTS 480), etc., for example as illustrated in FIG. 4. Unless expressly noted otherwise, the system version of such components may operate similarly to the device version of such components and thus the description of one version (e.g., the system version or the local version) applies to the description of the other version (e.g., the local version or system version) and vice-versa.

Figure 11:
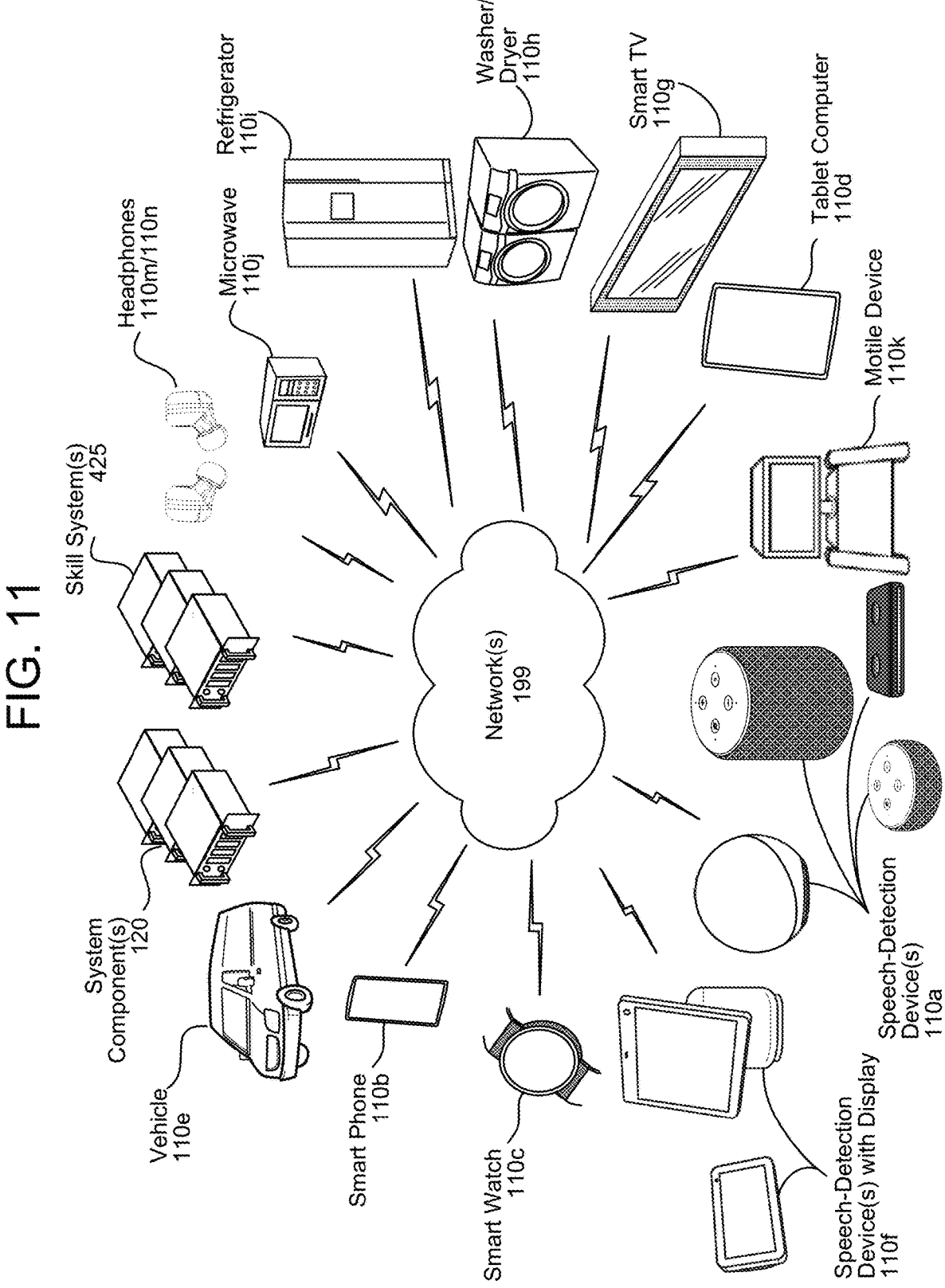
FIG. 11 illustrates an example of a computer network for use with the overall system, according to embodiments of the present disclosure.

As illustrated in FIG. 11, multiple devices (110a-110n, 120, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 425, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, by a speech processing system, a first spoken natural language question;
determining, using automatic speech recognition (ASR) processing, first ASR output data corresponding to a first textual transcription of the first spoken natural language question;
determining, using the first ASR output data, a first context of the first spoken natural language question, the first context representing a context and/or a subject of the first spoken natural language question;
determining, based on the first context, at least one information record of a data source including a plurality of information records;
identifying a first knowledge graph representing the data source;
generating, from the first knowledge graph, a first subgraph representing the at least one information record of the data source;
generating, using the at least one information record, a first data structure representing at least one relationship of a first entity and a second entity, wherein the at least one relationship is described in the at least one information record of the data source;
determining, using a language generation model to traverse the first subgraph, a first tuple responsive to the first spoken natural language question;
generating, using the language generation model, output data including the first tuple;
after generation of the output data, validating that the first tuple corresponds to the at least one relationship represented by the first data structure;
in response to validating that the first tuple corresponds to at least one relationship represented by the first data structure, determining, based on the first tuple, a first sentence from the at least one information record;
determining, using the first sentence, a response to the first spoken natural language question; and
causing a device to present the response.

2. A computer-implemented method of claim 1, further comprising:
prior to receiving the first spoken natural language question, receiving a prior natural language user input; and
determining, using ASR processing, second ASR output data corresponding to a second textual transcription of the prior natural language user input,
wherein determining the first context further includes:
determining a second context based on both the first ASR output data and the second ASR output data; and
using the second context as the first context.

3. A computer-implemented method of claim 1, further comprising:
determining, using the first data structure, a second sentence from the at least one information record, wherein the second sentence is determined by traversing a path of the first data structure originating from the at least one relationship;
generating, using the second sentence, a user prompt; and
causing a device to present the user prompt.

4. A computer-implemented method of claim 1, further comprising:
prior to generating the first tuple, generating, using the first subgraph and the first context as input to the language generation model, a second tuple responsive to the first context, wherein the second tuple represent a second relationship of the first entity and the second entity;

determining that the second relationship is unrepresented in the first data structure; and in response to the second relationship being unrepresented in the first data structure, determining the second tuple is invalid.

5. A computer-implemented method, comprising:

receiving input data representing a user input;

determining a first context of the input data, the first context representing a context and/or subject of the user input;

determining, using the first context, graph data representing a first information record stored in a data source including a plurality of information records;

processing the graph data and the input data using a generative language model to generate a first response to the user input, wherein the first response represents a first specific item of information;

after generation of the first response, validating that the first specific item of information that is included in the first response is represented in the first information record stored in the data source; and in response to validating that the first specific item of information is represented in the first information record, generating output data based at least in part on the first response to the user input.

6. A computer-implemented method of claim 5, further comprising:

generating a first data structure representing at least one entity relationship represented in the first information record, wherein determining the first specific item of information is represented in the first information record further comprises determining the first response corresponds to the at least one entity relationship.

7. A computer-implemented method of claim 6, further comprising:

determining, using the first data structure, at least a second entity relationship of the first data structure based on the first specific item of information; and generating, using at least the second entity relationship, a user prompt, wherein generating the output data is based at least in part on the first response and the user prompt.

8. A computer-implemented method of claim 5, further comprising:

prior to generating the first response, determining, using the generative language model to traverse the graph data, a second response to the user input, wherein the second response represents a second specific item of information; and determining the second specific item of information is unrepresented in the first information record.

9. A computer-implemented method of claim 5, further comprising:

receiving at least one prior user input, wherein determining first context further includes using the input data and the at least one prior user input.

10. A computer-implemented method of claim 5, further comprising:

receiving second input data;

determining a second context of the second input data, the second context representing a context and/or subject of the second input data;

determining the second context corresponds to the first context;

determining, using the generative language model to traverse the graph data, a second response to the second input data, wherein the second response represents a second specific item of information;

determining the second specific item of information is represented in the first information record; and in response to determining the second specific item of information is represented in the first information record, generating second output data based at least in part on the second response.

11. A computer-implemented method of claim 5, further comprising:

determining a second information record corresponding to the first context, wherein a second item of information of the first information record corresponds to a third item of information of the second information record, wherein the graph data includes representation of the first information record and the second information record.

12. A computer-implemented method of claim 5, further comprising:

prior to receiving the input data, receiving, from a device, audio data representing spoken natural language user input;

determining, using automatic speech recognition (ASR) processing, the input data from the audio data;

after determining the first specific item of information is represented in the first information record, performing natural language generation processing using the first response to determine the output data; and sending the output data to the device.

13. A system, comprising:

at least one processor; and at least one memory comprising instructions that, when executed by the at least one processor, cause the system to:

receive input data representing user input;

determine a first context of the input data, the first context representing a context and/or subject of the user input;

determine, using the first context, graph data representing a first information record stored in a data source including a plurality of information records;

process the graph data and the input data using a generative language model to generate a first response to the user input, wherein the first response represents a first specific item of information;

after generation of the first response, validate that the first specific item of information that is included in the first response is represented in the first information record stored in the data source; and in response to validating that the first specific item of information is represented in the first information record, generate output data based at least in part on the first response.

14. The system of claim 13, wherein the at least one memory further includes instructions that, when executed by the at least one processor, further cause the system to:

generate a first data structure representing at least one entity relationship represented in the first information record, wherein determining the first specific item of information is represented in the first information record further comprises determining the first response corresponds to the at least one entity relationship.

15. The system of claim 14, wherein the at least one memory further includes instructions that, when executed by the at least one processor, further cause the system to:

determine, using the first data structure, at least a second entity relationship of the first data structure based on the first specific item of information; and generate, using at the second entity relationship, a user prompt, wherein generating the output data is based at least in part on the first response and the user prompt.

16. The system of claim 13, wherein the at least one memory further includes instructions that, when executed by the at least one processor, further cause the system to:

prior to generating the first response, determine, using the generative language model to traverse the graph data, a second response to the user input, wherein the second response represents a second specific item of information; and determine the second specific item of information is unrepresented in the first information record.

17. The system of claim 13, wherein the at least one memory further includes instructions that, when executed by the at least one processor, further cause the system to:

receive at least one prior user input, wherein determining first context further includes using the input data and the at least one prior user input.

18. The system of claim 13, wherein the at least one memory further includes instructions that, when executed by the at least one processor, further cause the system to:

receive second input data;

determine a second context of the second input data, the second context representing a context and/or subject of the second input data;

determine the second context corresponds to the first context;

determine, using the generative language model to traverse the graph data, a second response to the second input data, wherein the second response represents a second specific item of information;

determine the second specific item of information is represented in the first information record; and in response to determining the second specific item of information is represented in the first information record, generate second output data based at least in part on the second response.

19. The system of claim 13, wherein the at least one memory further includes instructions that, when executed by the at least one processor, further cause the system to:

determine a second information record corresponding to the first context, wherein a second item of information of the first information record corresponds to a third item of information of the second information record, wherein the graph data includes representation of the first information record and the second information record.

20. The system of claim 13, wherein the at least one memory further includes instructions that, when executed by the at least one processor, further cause the system to:

prior to receiving the input data, receive, from a device, audio data representing spoken natural language user input;

determine, using automatic speech recognition (ASR) processing, the input data from the audio data;

after determining the first specific item of information is represented in the first information record, perform natural language generation processing using the first response to determine the output data; and send the output data to the device.

* * * * *